United States Patent
Hua et al.

(10) Patent No.: US 11,079,272 B2
(45) Date of Patent: Aug. 3, 2021

(54) DETECTION CIRCUIT AND DRIVING METHOD THEREFOR, DETECTION SUBSTRATE AND DETECTION DEVICE COMPRISING A SECOND STORAGE SUB-CIRCUIT GROUP WITH A SECOND VOLTAGE TERMINAL GROUP AND A SECOND CONTROL SIGNAL TERMINAL GROUP

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Gang Hua, Beijing (CN); Yanna Xue, Beijing (CN); Yong Zhang, Beijing (CN); Lu Bai, Beijing (CN); Haobo Fang, Beijing (CN); Jian Lin, Beijing (CN); Limin Zhang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/757,573

(22) PCT Filed: Oct. 14, 2019

(86) PCT No.: PCT/CN2019/111063
§ 371 (c)(1),
(2) Date: Apr. 20, 2020

(87) PCT Pub. No.: WO2020/093841
PCT Pub. Date: May 14, 2020

(65) Prior Publication Data
US 2021/0164833 A1    Jun. 3, 2021

(30) Foreign Application Priority Data

Nov. 7, 2018  (CN) .......................... 201811317887.1

(51) Int. Cl.
*G09G 3/32*    (2016.01)
*G01J 1/46*    (2006.01)

(52) U.S. Cl.
CPC ...................................... *G01J 1/46* (2013.01)

(58) Field of Classification Search
CPC ......... G09G 3/3233; G09G 2300/0861; G09G 2320/0295; G09G 2320/0626;
(Continued)

(56) References Cited

U.S. PATENT DOCUMENTS 5,623,249 A * 4/1997 Camire ............ G08B 13/19602
340/511
6,476,864 B1   11/2002 Borg et al.
(Continued)

FOREIGN PATENT DOCUMENTS

CN         1239308 A    12/1999
CN      101490580 A     7/2009
(Continued)

OTHER PUBLICATIONS

Notification to Grant Patent Right for Invention issued in related Chinese Application No. 201811317887.1, dated May 8, 2020, with English language translation.
(Continued)

*Primary Examiner* — Que Tan Le
(74) *Attorney, Agent, or Firm* — McDermott Will and Emery LLP

(57) ABSTRACT

A detection circuit includes a photosensitive device, a first storage sub-circuit, a second storage sub-circuit group, and an output control sub-circuit. The photosensitive device is
(Continued)

coupled to a device voltage terminal and an output node. The first storage sub-circuit is coupled to the output node and a first voltage terminal. The second storage sub-circuit group is coupled to the output node, a second voltage terminal group and a second control signal terminal group. The output control sub-circuit is coupled to a signal receiving terminal, a first control signal terminal, and the output node.

20 Claims, 10 Drawing Sheets

(58) Field of Classification Search
CPC .... G09G 3/325; G09G 3/3258; G09G 3/3283; G09G 3/3406; H04N 5/374
USPC .......................................... 250/214 R, 208.1
See application file for complete search history.

(56) References Cited

U.S. PATENT DOCUMENTS

| | | | |
|---|---|---|---|
| 6,958,775 | B1 | 10/2005 | Shinotsuka et al. |
| 2009/0321643 | A1 | 12/2009 | Rutten et al. |
| 2012/0205549 | A1 | 8/2012 | Simon et al. |
| 2013/0003928 | A1 | 1/2013 | Pietig et al. |
| 2015/0078530 | A1 | 3/2015 | Hawver et al. |
| 2016/0088251 | A1 | 3/2016 | Luo et al. |
| 2017/0269782 | A1 | 9/2017 | Wu |
| 2019/0238778 | A1 | 8/2019 | Duan et al. |
| 2020/0212137 | A1 | 7/2020 | Wang et al. |

FOREIGN PATENT DOCUMENTS

| | | |
|---|---|---|
| CN | 102597806 A | 7/2012 |
| CN | 102792676 A | 11/2012 |
| CN | 103259985 A | 8/2013 |
| CN | 103873787 A | 6/2014 |
| CN | 105044955 A | 11/2015 |
| CN | 105556949 A | 5/2016 |
| CN | 107846559 A | 3/2018 |
| CN | 108174124 A | 6/2018 |
| CN | 108649059 A | 10/2018 |
| CN | 109470283 A | 3/2019 |
| EP | 1887626 A1 | 2/2008 |
| JP | S63-209175 A | 8/1988 |

OTHER PUBLICATIONS

First Office Action issued in corresponding Chinese Application No. 201811317887.1, dated Nov. 5, 2019, with English language translation.

* cited by examiner

DETECTION CIRCUIT AND DRIVING METHOD THEREFOR, DETECTION SUBSTRATE AND DETECTION DEVICE COMPRISING A SECOND STORAGE SUB-CIRCUIT GROUP WITH A SECOND VOLTAGE TERMINAL GROUP AND A SECOND CONTROL SIGNAL TERMINAL GROUP

CROSS-REFERENCE TO RELATED APPLICATIONS

This application is a national phase entry under 35 USC 371 of International Patent Application No. PCT/CN2019/111063 filed on Oct. 14, 2019, which claims priority to Chinese Patent Application No. 201811317887.1, filed with the Chinese Patent Office on Nov. 7, 2018, titled "DETECTION CIRCUIT AND DRIVING METHOD THEREFOR, SUBSTRATE AND DETECTOR", which are incorporated herein by reference in their entirety.

TECHNICAL FIELD

The present disclosure relates to the technical field of detection devices, and in particular, to a detection circuit and a driving method therefor, a detection substrate and a detection device.

BACKGROUND

With the development of electronic technology, detection devices that use the electronic technology to achieve an accurate information acquisition have brought great convenience to people's daily life.

The detection device converts received optical signals into electrical signals (i.e., photo-generated electrons) through a sensor. A detection device capable of achieving a fast reading and satisfying a large storage capacity of photo-generated electrons is a development trend of future detection devices.

SUMMARY

In a first aspect, some embodiments of the present disclosure provide a detection circuit. The detection circuit includes an output control sub-circuit, a first storage sub-circuit, a photosensitive device, and a second storage sub-circuit group. The photosensitive device is coupled to a device voltage terminal and an output node, and is configured to convert received optical signals into electrical signals and to transmit the electrical signals to the output node under action of a device voltage transmitted through the device voltage terminal. The first storage sub-circuit is coupled to the output node and a first voltage terminal, and is configured to store at least a part of the electrical signals. The second storage sub-circuit group is coupled to the output node, a second voltage terminal group and a second control signal terminal group, and is configured to store a part of the electrical signals under control of at least one second turn-on signal transmitted through the second control signal terminal group. The output control sub-circuit is coupled to a signal receiving terminal, a first control signal terminal, and the output node, and is configured to transmit the electrical signals from the output node to the signal receiving terminal under control of a first turn-on signal transmitted through the first control signal terminal.

In some embodiments of the present disclosure, the second storage sub-circuit group includes one second storage sub-circuit, the second voltage terminal group includes one second voltage terminal, and the second control signal terminal group includes one second control signal terminal. The second storage sub-circuit is configured to store the part of the electrical signals under control of a second turn-on signal transmitted through the second control signal terminal.

In some embodiments of the present disclosure, the second storage sub-circuit group includes a plurality of second storage sub-circuits, the second voltage terminal group includes a plurality of second voltage terminals, and the second control signal terminal group includes a plurality of second control signal terminals. Each second storage sub-circuit is coupled to the output node, a corresponding second voltage terminal, and a corresponding second control signal terminal, and is configured to store a part of the electrical signals under control of a second turn-on signal transmitted through the corresponding second control signal terminal.

In some embodiments of the present disclosure, the second storage sub-circuit group includes a plurality of second storage sub-circuits, the second voltage terminal group includes a plurality of second voltage terminals, and the second control signal terminal group includes a plurality of second control signal terminals. Each of a part of the plurality of second storage sub-circuits includes a plurality of sub-banks arranged in cascade. A first-stage sub-bank is coupled to the output node, a corresponding second voltage terminal, and a corresponding second control signal terminal, and is configured to store a part of the electrical signals under control of a second turn-on signal transmitted through the corresponding second control signal terminal. A sub-bank in each stage after the first-stage sub-bank is coupled to a previous-stage sub-bank, a corresponding second voltage terminal, and a corresponding second control signal terminal, and is configured to store a part of the electrical signals under control of a second turn-on signal transmitted through the corresponding second control signal terminal. Each of a remaining part of the plurality of second storage sub-circuits is coupled to the output node, a corresponding second voltage terminal, and a corresponding second control signal terminal, and is configured to store a part of the electrical signals under control of a second turn-on signal transmitted through the corresponding second control signal terminal.

In some embodiments of the present disclosure, the second storage sub-circuit group includes a plurality of second storage sub-circuits arranged in cascade, the second voltage terminal group includes a plurality of second voltage terminals, and the second control signal terminal group includes a plurality of second control signal terminals. A first-stage second storage sub-circuit is coupled to the output node, a corresponding second voltage terminal, and a corresponding second control signal terminal, and is configured to store a part of the electrical signals under control of a second turn-on signal transmitted through the corresponding second control signal terminal. A second storage sub-circuit in each stage after the first-stage second storage sub-circuit is coupled to a previous-stage second storage sub-circuit, a corresponding second voltage terminal, and a corresponding second control signal terminal, and is configured to store a part of the electrical signals under control of a second turn-on signal transmitted through the corresponding second control signal terminal.

In some embodiments of the present disclosure, at least two of the plurality of second control signal terminals are different control signal terminals. Or, at least two of the plurality of second voltage terminals are different voltage terminals. Or, at least two of the plurality of second control signal terminals are different control signal terminals, and at least two of the plurality of second voltage terminals are different voltage terminals.

In some embodiments of the present disclosure, the plurality of second control signal terminals are further coupled to one control signal terminal. Or, the plurality of second voltage terminals are further coupled to one voltage terminal. Or, the plurality of second control signal terminals are further coupled to one control signal terminal, and the plurality of second voltage terminals are further coupled to one voltage terminal.

In some embodiments of the present disclosure, a maximum amount of charge that the first storage sub-circuit is capable to store is different from a maximum amount of charge that the second storage sub-circuit group is capable to store.

In some embodiments of the present disclosure, maximum amounts of charge that at least two of the plurality of second storage sub-circuits are capable to store are different.

In some embodiments of the present disclosure, the photosensitive device includes a photodiode, one electrode of the photodiode is coupled to the device voltage terminal, and another electrode of the photodiode is coupled to the output node. The first storage sub-circuit includes a first capacitor, a first electrode of the first capacitor is coupled to the output node, and a second electrode of the first capacitor is coupled to the first voltage terminal. The output control sub-circuit includes a first transistor, a gate of the first transistor is coupled to the first control signal terminal, a first electrode of the first transistor is coupled to the signal receiving terminal, and a second electrode of the first transistor is coupled to the output node.

In some embodiments of the present disclosure, the second storage sub-circuit includes a second transistor and a second capacitor. A gate of the second transistor is coupled to the second control signal terminal, a first electrode of the second transistor is coupled to the output node, and a second electrode of the second transistor is coupled to a first electrode of the second capacitor. A second electrode of the second capacitor is coupled to the second voltage terminal.

In some embodiments of the present disclosure, each second storage sub-circuit includes a second transistor and a second capacitor. A gate of the second transistor of each second storage sub-circuit is coupled to a corresponding second control signal terminal, a first electrode of the second transistor is coupled to the output node, and a second electrode of the second transistor is coupled to a first electrode of the second capacitor in a same second storage sub-circuit. A second electrode of the second capacitor of each second storage sub-circuit is coupled to a corresponding second voltage terminal.

In some embodiments of the present disclosure, each sub-bank includes a third transistor and a third capacitor. In the first-stage sub-bank: a gate of a third transistor is coupled to a corresponding second control signal terminal, a first electrode of the third transistor is coupled to the output node, and a second electrode of the third transistor is coupled to a first electrode of a third capacitor. A second electrode of the third capacitor is coupled to a corresponding second voltage terminal. In the sub-bank in each stage after the first-stage sub-bank: a gate of a third transistor is coupled to a corresponding second control signal terminal, a first electrode of the third transistor is coupled to a second electrode of a third transistor of a previous-stage sub-bank, and a second electrode of the third transistor is coupled to a first electrode of a third capacitor. A second electrode of the third capacitor is coupled to a corresponding second voltage terminal. Each of the remaining part of the plurality of second storage sub-circuits includes a second transistor and a second capacitor. A gate of the second transistor is coupled to a corresponding second control signal terminal, a first electrode of the second transistor is coupled to the output node, and a second electrode of the second transistor is coupled to a first electrode of the second capacitor in a same second storage sub-circuit. A second electrode of the second capacitor is coupled to a corresponding second voltage terminal.

In some embodiments of the present disclosure, each second storage sub-circuit includes a second transistor and a second capacitor. In the first-stage second storage sub-circuit: a gate of a second transistor is coupled to a corresponding second control signal terminal, a first electrode of the second transistor is coupled to the output node, and a second electrode of the second transistor is coupled to a first electrode of a second capacitor. A second electrode of the second capacitor is coupled to a corresponding second voltage terminal. In the second storage sub-circuit in each stage after the first-stage second storage sub-circuit: a gate of a second transistor is coupled to a corresponding second control signal terminal, a first electrode of the second transistor is coupled to a second electrode of a second transistor of a previous-stage second storage sub-circuit, and a second electrode of the second transistor is coupled to a first electrode of a second capacitor. A second electrode of the second capacitor is coupled to a corresponding second voltage terminal.

In a second aspect, some embodiments of the present disclosure provide a detection substrate including a plurality of any one of the above detection circuits.

In some embodiments of the present disclosure, the first storage sub-circuit includes a first capacitor. The second storage sub-circuit group includes at least one second storage sub-circuits, and each second storage sub-circuit includes a second capacitor. A second electrode of the first capacitor and a second electrode of the second capacitor are disposed in a same layer and made of a same material. Or, a first electrode of the first capacitor and a first electrode of the second capacitor are disposed in a same layer and made of a same material. Or, a second electrode of the first capacitor and a second electrode of the second capacitor are disposed in a same layer and made of a same material, and a first electrode of the first capacitor and a first electrode of the second capacitor are disposed in a same layer and made of a same material.

In some embodiments of the present disclosure, the first storage sub-circuit further includes a first transistor. Each second storage sub-circuit further includes a second transistor. A gate of the first transistor, a gate of the second transistor, the second electrode of the first capacitor, and the second electrode of the second capacitor are disposed in a same layer and made of a same material. Or, a first electrode and a second electrode of the first transistor, a first electrode and a second electrode of the second transistor, the first electrode of the first capacitor, and the first electrode of the second capacitor are disposed in a same layer and made of a same material. Or, a gate of the first transistor, a gate of the second transistor, the second electrode of the first capacitor, and the second electrode of the second capacitor are disposed in a same layer and made of a same material, and a first electrode and a second electrode of the first transistor, a first electrode and a second electrode of the second transistor, the first electrode of the first capacitor, and the first electrode of the second capacitor are disposed in a same layer and made of a same material.

In some embodiments of the present disclosure, the first storage sub-circuit includes a first capacitor. The second storage sub-circuit group includes a plurality of second storage sub-circuits, each of a part of the plurality of second storage sub-circuits includes a plurality of sub-banks arranged in cascade, each sub-bank includes a third capacitor, and each of a remaining part of the plurality of second storage sub-circuits includes a second capacitor. A second electrode of the first capacitor, a second electrode of the second capacitor, and a second electrode of the third capacitor are disposed in a same layer and made of a same material. Or, a first electrode of the first capacitor, a first electrode of the second capacitor, and a first electrode of the third capacitor are disposed in a same layer and made of a same material. Or, a second electrode of the first capacitor, a second electrode of the second capacitor, and a second electrode of the third capacitor are disposed in a same layer and made of a same material, and a first electrode of the first capacitor, a first electrode of the second capacitor, and a first electrode of the third capacitor are disposed in a same layer and made of a same material.

In some embodiments of the present disclosure, the first storage sub-circuit further includes a first transistor, each sub-bank further includes a third transistor, and each of the remaining part of the plurality of second storage sub-circuits further includes a second transistor. A gate of the first transistor, a gate of the second transistor, a gate of the third transistor, the second electrode of the first capacitor, the second electrode of the second capacitor, and the second electrode of the third capacitor are disposed in a same layer and made of a same material. Or, a first electrode and a second electrode of the first transistor, a first electrode and a second electrode of the second transistor, a first electrode and a second electrode of the third transistor, the first electrode of the first capacitor, the first electrode of the second capacitor and the first electrode of the third capacitor are disposed in a same layer and made of a same material. Or, a gate of the first transistor, a gate of the second transistor, a gate of the third transistor, the second electrode of the first capacitor, the second electrode of the second capacitor, and the second electrode of the third capacitor are disposed in a same layer and made of a same material, and a first electrode and a second electrode of the first transistor, a first electrode and a second electrode of the second transistor, a first electrode and a second electrode of the third transistor, the first electrode of the first capacitor, the first electrode of the second capacitor and the first electrode of the third capacitor are disposed in a same layer and made of a same material.

In a third aspect, some embodiments of the present disclosure provide a detection device including any one of the above detection substrates.

In some embodiments of the present disclosure, the detection device further includes a processor. The processor is configured to input at least one second turn-on signal to the second control signal terminal group in a case where an amount of charge of the electrical signals generated by the photosensitive device is greater than a maximum amount of charge that the first storage sub-circuit is capable to store, so as to turn on the second storage sub-circuit group to store a part of the electrical signals; and input at least one second turn-off signal to the second control signal terminal group in a case where the amount of the charge of the electrical signals generated by the photosensitive device is less than or equal to the maximum amount of the charge that the first storage sub-circuit is capable to store, so as to turn off the second storage sub-circuit group.

In a fourth aspect, some embodiments of the present disclosure provide a method for driving any one of the above detection circuits. The method includes: inputting a first turn-off signal to the first control signal terminal, and the output control sub-circuit being turned off under control of the received first turn-off signal; inputting a device voltage to the device voltage terminal, converting, by the photosensitive device, the received optical signals into the electrical signals, and transmitting, by the photosensitive device, the electrical signals to the output node under action of the received device voltage; in a case where an amount of charge of the electrical signals generated by the photosensitive device is less than or equal to a maximum amount of charge that the first storage sub-circuit is capable to store, storing, by the first storage sub-circuit, all the electrical signals, and inputting at least one second turn-off signal to the second control signal terminal group, and the second storage sub-circuit group being turned off under control of the received at least one second turn-off signal; and, in a case where the amount of the charge of the electrical signals generated by the photosensitive device is greater than the maximum amount of the charge that the first storage sub-circuit is capable to store, storing, by the first storage sub-circuit, a part of the electrical signals, and inputting at least one second turn-on signal to the second control signal terminal group, and storing, by the second storage sub-circuit group, a remaining part of the electrical signals under control of the received at least one second turn-on signal; and inputting a first turn-on signal to the first control signal terminal, and transmitting, by the output control sub-circuit, the electrical signals from the output node to the signal receiving terminal under control of the received first turn-on signal.

BRIEF DESCRIPTION OF THE DRAWINGS

In order to describe technical solutions in embodiments of the present disclosure or in the prior art more clearly, the accompanying drawings to be used in the description of embodiments or the prior art will be introduced briefly. Obviously, the accompanying drawings to be described below are merely some embodiments of the present disclosure, and a person of ordinary skill in the art can obtain other drawings according to these drawings without paying any creative effort.

DETAILED DESCRIPTION

The technical solutions in embodiments of the present disclosure will be described clearly and completely in combination with accompanying drawings in the embodiments of the present disclosure. Obviously, the described embodiments are merely some but not all of the embodiments of the present disclosure. All other embodiments obtained on a basis of the embodiments of the present disclosure by a person of ordinary skill in the art without paying any creative effort shall be included in the protection scope of the present disclosure.

In a process of reading signals of a detection circuit, in order to achieve a large reading number of signals, reading time needs to be less than or equal to 10RC. R is a resistance value of a transistor coupled to a signal receiving terminal in a turn-on state, which is usually a fixed value during design and is difficult to change. Only by designing a capacitance C of a capacitor of the detection circuit to be small enough, may the signals be read fast.

Photo-generated electrons are accumulated on the capacitor to charge the capacitor. A difference in amounts of charge in different detection circuits after charging is finally converted to a gray-scale image (i.e., an image with a difference in different colors from black to white) through a circuit device such as an analog-to-digital converter (ADC). However, if the capacitance of the capacitor in the detection circuit is small, after the capacitor is fully charged with a part of the photo-generated electrons, the remaining photo-generated electrons cannot be stored, which causes an overall gray scale range of a finally generated image to be very small, thereby causing that an amount of information may be obtained from the image is reduced.

Figure 1:
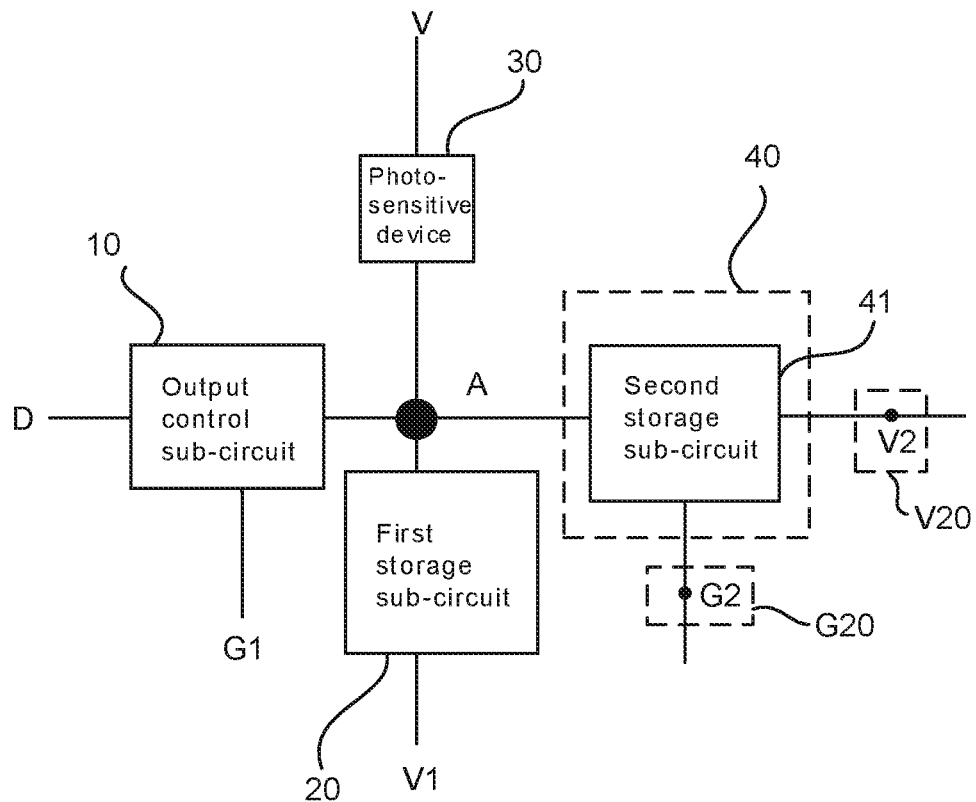
FIG. 1 is a schematic diagram showing a structure of a detection circuit, according to some embodiments of the present disclosure.

On this basis, some embodiments of the present disclosure provide a detection circuit. As shown in FIG. 1, the detection circuit includes an output control sub-circuit 10, a first storage sub-circuit 20, a photosensitive device 30, and a second storage sub-circuit group 40.

In some embodiments, the photosensitive device 30 is coupled to a device voltage terminal V and an output node A, and is configured to convert received optical signals into electrical signals and to transmit the electrical signals to the output node A.

A specific structure of the photosensitive device 30 is not limited, as long as the photosensitive device 30 may convert the received optical signals into the electrical signals. The optical signals here may be, for example, X-rays, visible light, or ultraviolet light. The optical signals may be selected according to a photosensitive principle of the photosensitive device 30 (i.e., generating electrical signals by sensing X-rays, generating electrical signals by sensing visible light, or generating electrical signals by sensing ultraviolet light), which is not limited herein.

The term "coupled" in the embodiments of the present disclosure is not limited to a physical connection, as long as a signal transmission may be achieved.

The first storage sub-circuit 20 is coupled to the output node A and a first voltage terminal V1, and is configured to store electrical signals.

According to different detection needs, the first storage sub-circuit 20 may store all the electrical signals from the output node A. In this case, the second storage sub-circuit group 40 does not work. Or the first storage sub-circuit 20 may store a part of the electrical signals from the output node A. In this case, a remaining part of the electrical signals is stored in the second storage sub-circuit group 40.

The second storage sub-circuit group 40 is coupled to the output node A, a second voltage terminal group V20 and a second control signal terminal group G20, and is configured to store a part of the electrical signals under control of at least one second turn-on signal transmitted through the second control signal terminal group G20.

The second storage sub-circuit group 40 refers to a group of second storage sub-circuit(s), and there are one or more second storage sub-circuits in the group of second storage sub-circuit(s) (the word "more" referring to two or more). That is to say, the second storage sub-circuit group 40 includes at least one second storage sub-circuit 41, and a coupling manner of the at least one second storage sub-circuit 41 in the detection circuit will be described below.

Similarly, the second voltage terminal group V20 refers to a group of second voltage terminal(s), and there are one or more second voltage terminals in the group of second voltage terminal(s) (the word "more" referring to two or more). That is to say, the second voltage terminal group V20 includes at least one second voltage terminal V2. The at least one second voltage terminal V2 is configured to supply at least one voltage to the at least one second storage sub-circuit 41. A manner in which the at least one second voltage terminal V2 is coupled to the at least one second storage sub-circuit 41 will be described below.

Yet similarly, the second control signal terminal group G20 refers to a group of control signal terminal(s), and there are one or more second control signal terminals in the group of second control signal terminal(s) (the word "more" referring to two or more). That is to say, the second control signal terminal group G20 includes at least one second control signal terminal G2. The at least one second control signal terminal G2 is configured to provide at least one second turn-on signal or at least one second turn-off signal to the at least one second storage sub-circuit 41. A manner in which the at least one second control signal terminal G2 is coupled to the at least one second storage sub-circuit 41 will be described below.

The second storage sub-circuit group 40 is configured to store a part of the electrical signals. That is, the second storage sub-circuit group 40 plays a role of auxiliary storage. In a process of driving the detection circuit, the second storage sub-circuit group 40 may not work. For example, in order to ensure a fast reading, in a case where the first storage sub-circuit 20 cannot meet storage requirements, the second storage sub-circuit group 40 stores the remaining part of the electrical signals from the output node A.

The output control sub-circuit 10 is coupled to a signal receiving terminal D, a first control signal terminal G1 and the output node A, and is configured to transmit the electrical signals from the output node A to the signal receiving terminal D under control of a first turn-on signal transmitted through the first control signal terminal G1.

The second storage sub-circuit group 40 is set in the detection circuit provided by the embodiments of the present disclosure. In this way, in the case where the first storage sub-circuit 20 cannot meet the storage requirements, the second storage sub-circuit group 40 may be controlled to work by the at least one second turn-on signal transmitted through the second control signal terminal group G20. In a case where the first storage sub-circuit 20 can meet the storage requirements, the second storage sub-circuit group 40 may be controlled not to work by the at least one second turn-off signal transmitted through the second control signal terminal group G20. In this way, in a case where the detection circuit is applied to a detection device, the detection device may not only meet a requirement for fast reading but also meet a requirement for a large storage capacity of electrical signals, and an application range of the detection device is expanded.

In some embodiments, the first voltage terminal V1 and at least one second voltage terminal V2 in the second voltage terminal group V20 may be further coupled to one voltage terminal (that is, the voltage terminal may simultaneously provide a same voltage signal to the first voltage terminal V1 and the at least one second voltage terminal V2 in the second voltage terminal group V20). The first voltage terminal V1 and the at least one second voltage terminal V2 in the second voltage terminal group V20 may also be coupled to different voltage terminals. In a case where the first voltage terminal V1 and the at least one second voltage terminal V2 in the second voltage terminal group V20 are further coupled to one voltage terminal, a structure of the detection circuit is simple. In a case where the first voltage terminal V1 and the at least one second voltage terminal V2 in the second voltage terminal group V20 are coupled to different voltage terminals, different voltage terminals may provide different voltage signals respectively. It will be understood that, in some examples, different voltage terminals may also provide a same voltage signal.

In some embodiments, as shown in FIG. 1, the second storage sub-circuit group 40 includes one second storage sub-circuit 41, the second voltage terminal group V20 includes one second voltage terminal V2, and the second control signal terminal group G20 includes one second control signal terminal G2. The second storage sub-circuit 41 is configured to store a part of the electrical signals under control of a second turn-on signal transmitted through the second control signal terminal G2.

Figure 2:
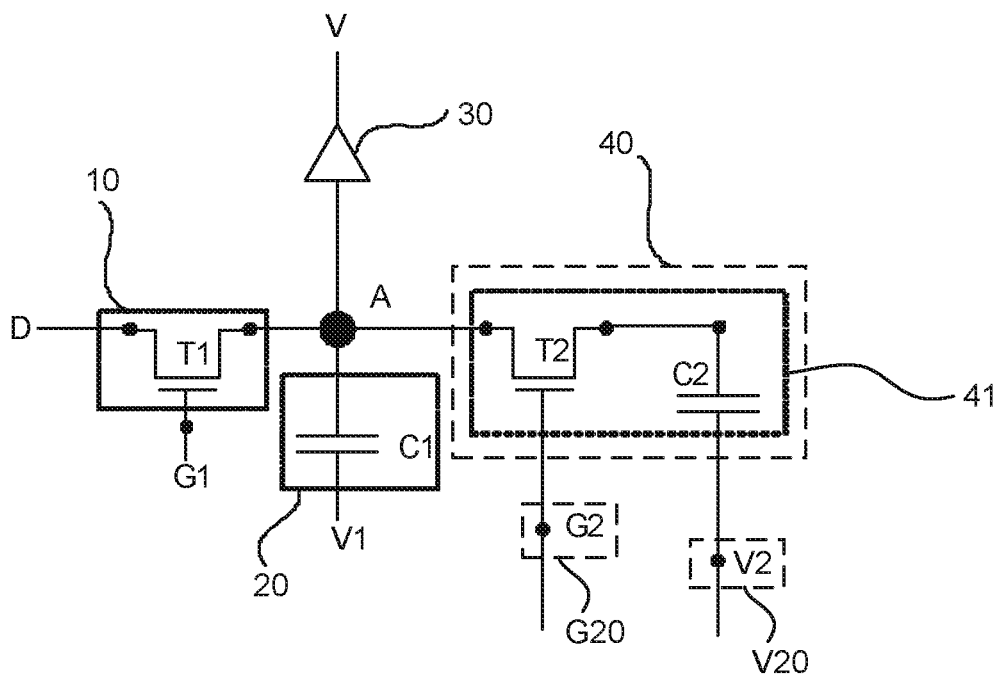
FIG. 2 is a schematic diagram showing structures of sub-circuits in a detection circuit, according to some embodiments of the present disclosure.

In some embodiments, as shown in FIG. 2, the second storage sub-circuit group 40 includes one second storage sub-circuit 41, the second voltage terminal group V20 includes one second voltage terminal V2, and the second control signal terminal group G20 includes one second control signal terminal G2. The second storage sub-circuit 41 includes a second transistor T2 and a second capacitor C2. A gate of the second transistor T2 is coupled to the second control signal terminal G2, a first electrode of the second transistor T2 is coupled to the output node A, a second electrode of the second transistor T2 is coupled to a first terminal of the second capacitor C2, and a second terminal of the second capacitor C2 is coupled to the second voltage terminal V2.

The output control sub-circuit 10 includes a first transistor T1. A gate of the first transistor T1 is coupled to the first control signal terminal G1, a first electrode of the first transistor T1 is coupled to the signal receiving terminal D, and a second electrode of the first transistor T1 is coupled to the output node A.

The first storage sub-circuit 20 includes a first capacitor C1. A first terminal of the first capacitor C1 is coupled to the output node A, and a second terminal of the first capacitor C1 is coupled to the first voltage terminal V1.

The photosensitive device 30 includes a photodiode. One electrode of the photodiode is coupled to the device voltage terminal V, and the other electrode of the photodiode is coupled to the output node A.

The photodiode may be, for example, a metal-semiconductor-metal (MSM) photodiode, or a positive intrinsic negative (PIN) photodiode.

In some embodiments, a capacitance of the second capacitor C2 is less than a capacitance of the first capacitor C1.

In some embodiments, the second storage sub-circuit group 40 includes a plurality of second storage sub-circuits 41 connected in a manner similar to a parallel connection manner, the second voltage terminal group V20 includes a plurality of second voltage terminals V2, and the second control signal terminal group G20 includes a plurality of second control signal terminals G2. Each second storage sub-circuit 41 is coupled to the output node A, a corresponding second voltage terminal V2 and a corresponding second control signal terminal G2, and is configured to store a part of the electrical signals from the output node A under control of a second turn-on signal transmitted through the corresponding second control signal terminal G2.

Here, the description that each second storage sub-circuit 41 is coupled to a corresponding second voltage terminal V2 means that, each second storage sub-circuit 41 is coupled to one second voltage terminal V2, and the second voltage terminal V2 coupled to the second storage sub-circuit 41 is a second voltage terminal V2 corresponding to the second storage sub-circuit. The description that each second storage sub-circuit 41 is coupled to a corresponding second control signal terminal G2 means that, each second storage sub-circuit 41 is coupled to one second control signal terminal G2, and the second control signal terminal G2 coupled to the second storage sub-circuit 41 is a second control signal terminal G2 corresponding to the second storage sub-circuit. In some examples, a plurality of second voltage terminals V2 may be further coupled to one voltage terminal. In this way, a same voltage signal may be provided to the plurality of second voltage terminals V2 through the one voltage terminal. A coupling manner of the plurality of second voltage terminals V2 may be set according to actual needs, which is not limited in the embodiments of the present disclosure. In some examples, a plurality of second control signal terminals G2 may be further coupled to one control signal terminal. In this way, a same control signal may be provided to the plurality of second control signal terminals G2 through the one control signal terminal. A coupling manner of the plurality of second control signal terminals G2 may be set according to actual needs, which is not limited in the embodiments of the present disclosure.

A plurality of second voltage terminals V2 and the first voltage terminal V1 may be further coupled to one voltage terminal (that is, the one voltage terminal may simultaneously provide a same voltage signal to the plurality of second voltage terminals V2 and the first voltage terminal V1). The plurality of second voltage terminals V2 and the first voltage terminal V1 may also be coupled to different voltage terminals.

In some embodiments, at least two of the plurality of second voltage terminals V2 in the second voltage terminal group V20 are coupled to different voltage terminal. In some examples, the plurality of second voltage terminals V2 are each coupled to a different voltage terminal. In some other examples, several of the plurality of second voltage terminals V2 are further coupled to one voltage terminal.

Figure 3:
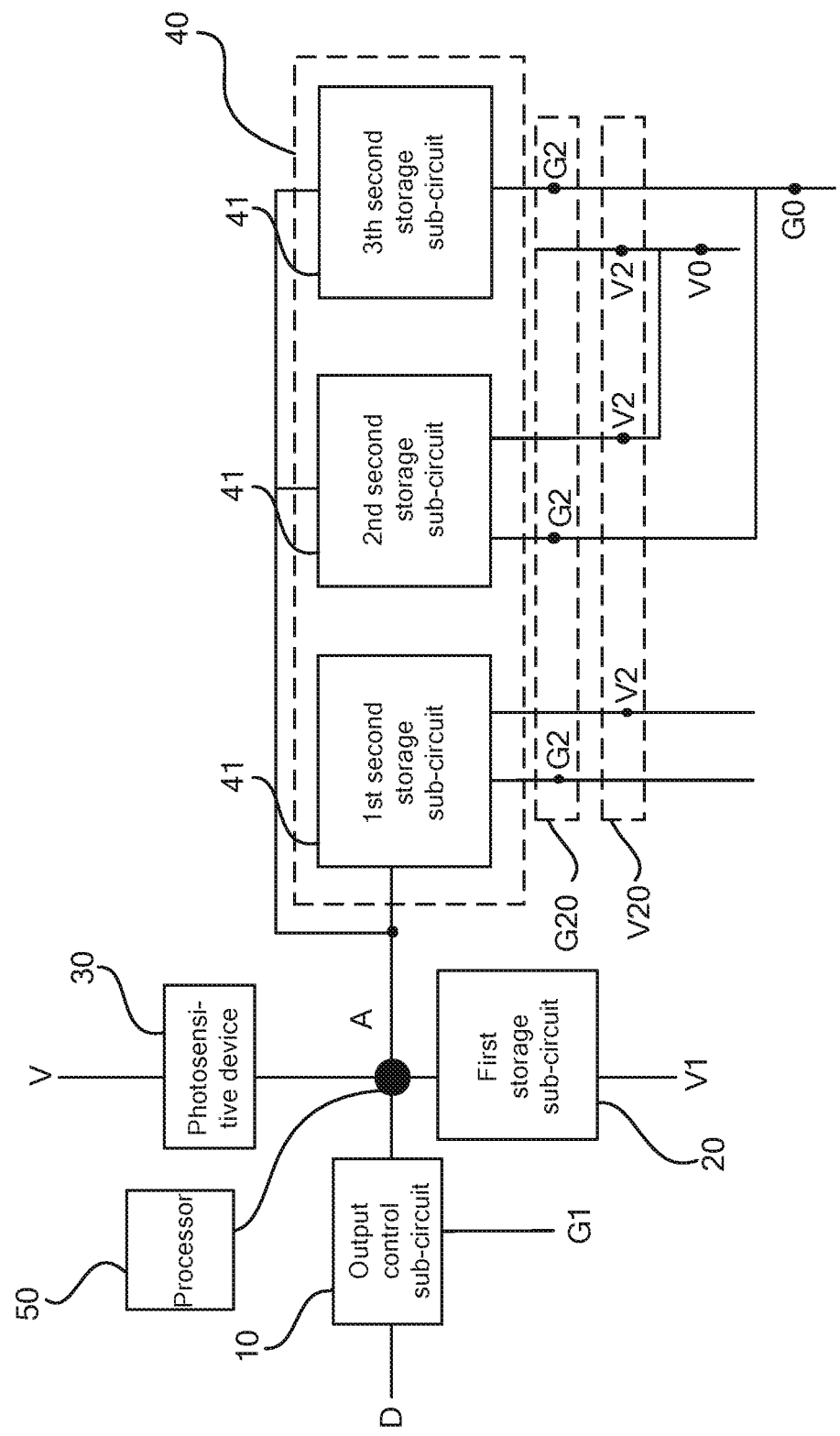
FIG. 3 is a schematic diagram showing a structure of another detection circuit, according to some embodiments of the present disclosure.

As shown in FIG. 3, the second storage sub-circuit group 40 includes three second storage sub-circuits 41. A 1st second storage sub-circuit 41 is coupled to a separate second voltage terminal V2, and a second voltage terminal V2 coupled to a 2nd second storage sub-circuit 41 and a second voltage terminal V2 coupled to a 3th second storage sub-circuit 41 are further coupled to one voltage terminal V0.

It will be noted that, FIGS. 3 to 8 only show examples in which several of the plurality of second voltage terminals V2 are further coupled to one voltage terminal V0, and do not limit a manner in which the several of the plurality of second voltage terminals V2 are further coupled to the one voltage terminal described in the embodiments of the present disclosure. It will be understood that, different voltage terminals may also provide a same voltage signal.

In some embodiments, a plurality of second voltage terminals V2 are further coupled to one voltage terminal V0.

In some embodiments, at least two of the plurality of second control signal terminals G2 in the second control signal terminal group G20 are coupled to different control signal terminals. In some examples, the plurality of second control signal terminals G2 are each coupled to a different control signal terminal. In some other examples, several of the plurality of second control signal terminals G2 are further coupled to one control signal terminal.

As shown in FIG. 3, the second storage sub-circuit group 40 includes three second storage sub-circuits 41. A 1st second storage sub-circuit 41 is coupled to a separate second control signal terminal G2, and a second control signal terminal G2 coupled to a 2nd second storage sub-circuit 41 and a second control signal terminal G2 coupled to a 3th second storage sub-circuit 41 are further coupled to one control signal terminal G0.

Figure 5:
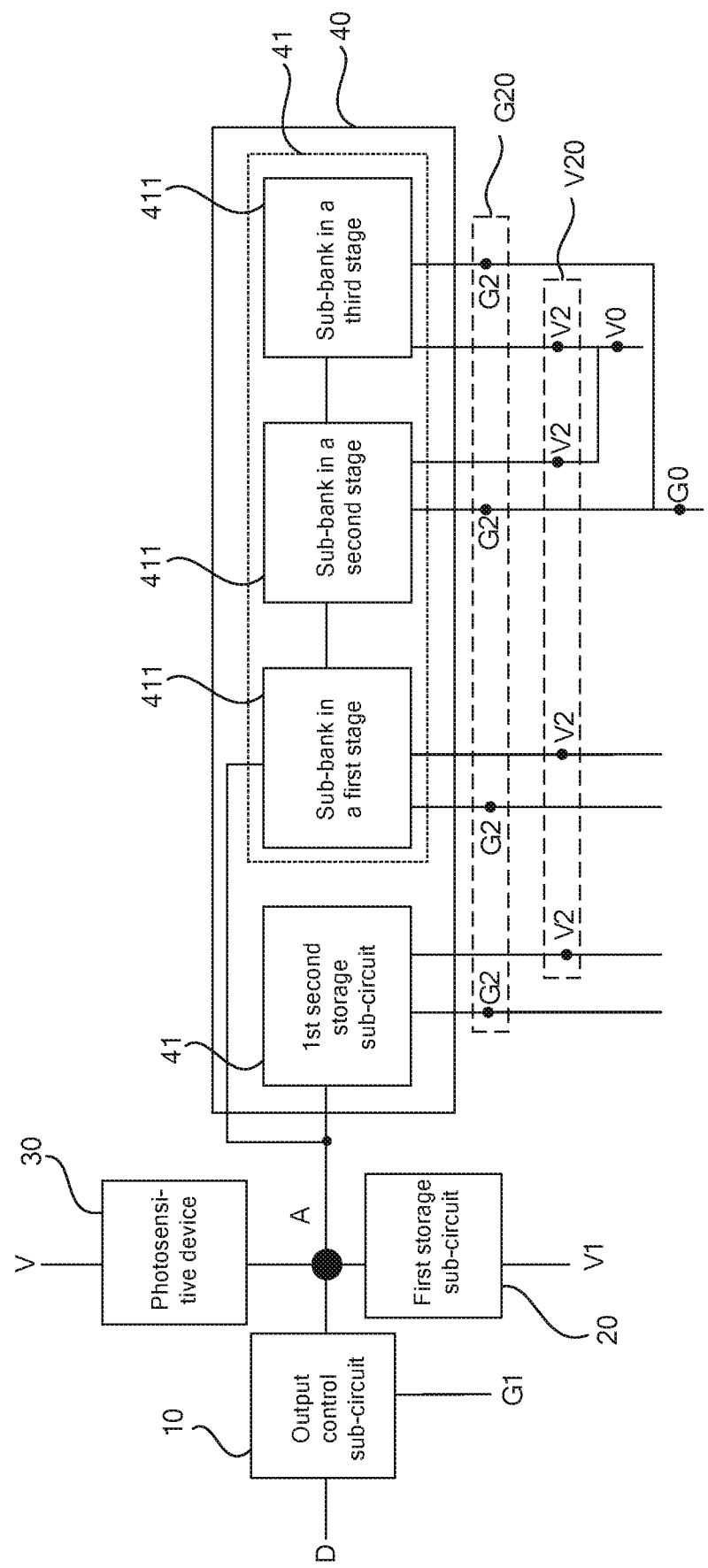
FIG. 5 is a schematic diagram showing a structure of yet another detection circuit, according to some embodiments of the present disclosure.
Figure 7:
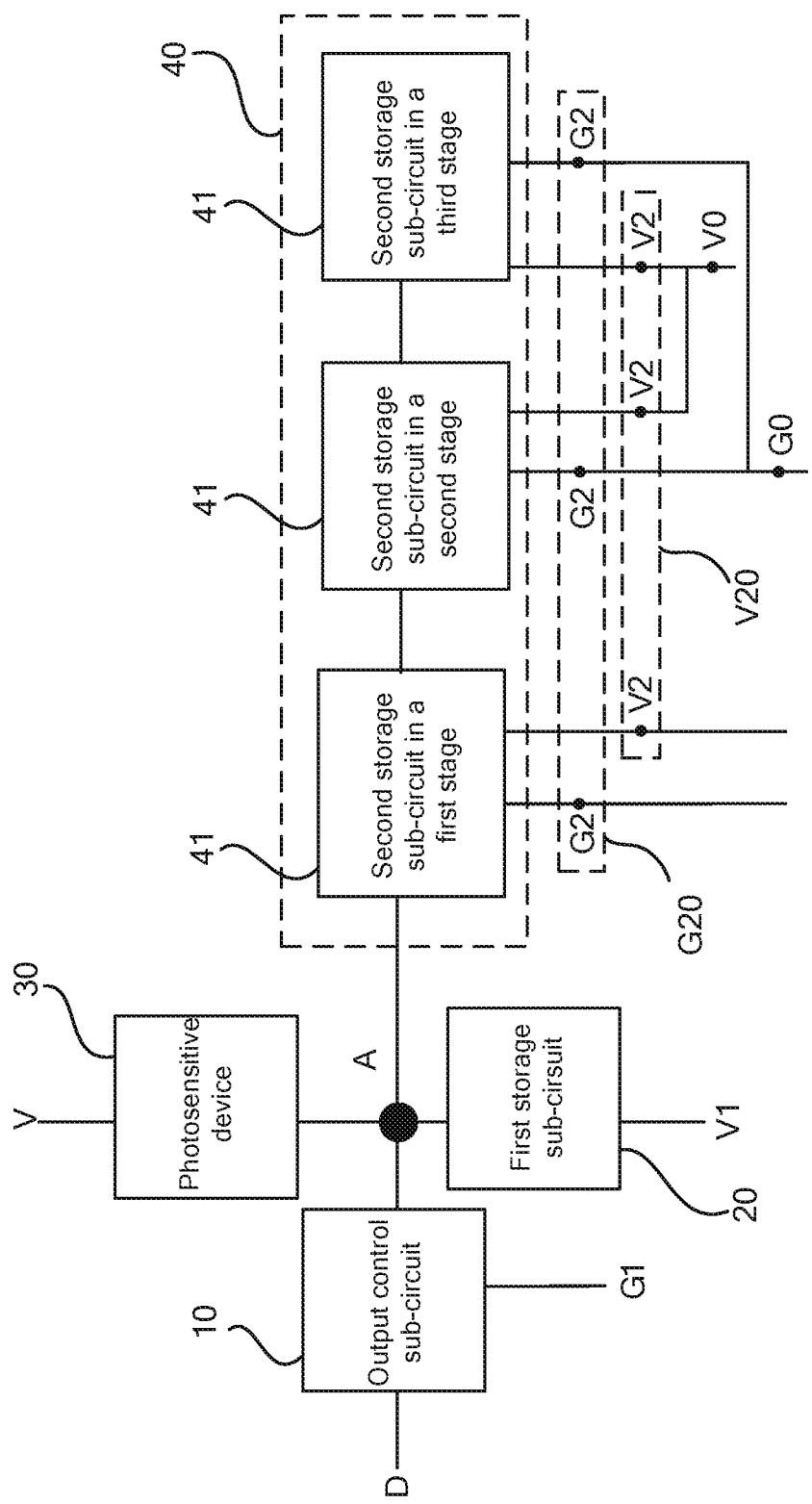
FIG. 7 is a schematic diagram showing a structure of yet another detection circuit, according to some embodiments of the present disclosure.

It will be noted that, FIGS. 3, 5 and 7 only show examples in which several of the plurality of second control signal terminals G2 are further coupled to one control signal terminal G0, and do not limit a manner in which the several of the plurality of second control signal terminals G2 are further coupled to the one control signal terminal described in the embodiments of the present disclosure. It will be understood that, different control signal terminals may also provide a same turn-on signal or a same turn-off signal.

In some embodiments, a plurality of second control signal terminals G2 are further coupled to one control signal terminal G0.

In some embodiments, a maximum amount of charge that the second storage sub-circuit group 40 is capable to store is different from a maximum amount of charge that the first storage sub-circuit 20 is capable to store. A maximum amount of storable charge refers to a maximum amount of charge that a circuit structure can store. An amount of the storable charge may be obtained according to the following formula: $Q=C\times U$, where C is a capacitance, and U is a potential difference. Therefore, in some examples, the description that a maximum amount of charge that the second storage sub-circuit group 40 is capable to store is different from a maximum amount of charge that the first storage sub-circuit 20 is capable to store means that, a capacitance C of the second storage sub-circuit group 40 is the same as a capacitance C of the first storage sub-circuit 20, and a potential difference U of the second storage sub-circuit group 40 is different from a potential difference U of the first storage sub-circuit 20. In some other examples, it means that, the capacitances C of the two are different and the potential differences U of the two are the same. In yet some other examples, it means that, the capacitances C of the two are different and the potential differences U of the two are also different.

It will be understood that, in a case where the second storage sub-circuit group 40 includes one second storage sub-circuit, the maximum amount of the charge that the second storage sub-circuit group 40 is capable to store is a maximum amount of charge that the second storage sub-circuit is capable to store. In a case where the second storage sub-circuit group 40 includes a plurality of second storage sub-circuits, the maximum amount of the charge that the second storage sub-circuit group 40 is capable to store is a sum of maximum amounts of charge that the plurality of second storage sub-circuits are capable to store.

In some embodiments, the maximum amount of the charge that the second storage sub-circuit group 40 is capable to store is greater than the maximum amount of the charge that the first storage sub-circuit 20 is capable to store.

In some embodiments, the second storage sub-circuit group 40 includes a plurality of second storage sub-circuits 41. The maximum amounts of the charge that the plurality of second storage sub-circuits 41 are capable to store are the same or not exactly the same. In some embodiments, the maximum amounts of the charge that the plurality of second storage sub-circuits 41 are capable to store are different.

In some embodiments of the present disclosure, the second storage sub-circuit group 40 includes a plurality of second storage sub-circuits 41 directly coupled to the output node A. In this way, the electrical signals from the output node may be directly transmitted to each second storage sub-circuit 41, the electrical signals from the output node A may be stored to a maximum extent, and a loss of the electrical signals may be reduced.

On this basis, in a case where the plurality of second storage sub-circuits 41 are respectively coupled to different second control signal terminals G2, the plurality of second storage sub-circuits 41 may be separately controlled. In this way, some of the plurality of second storage sub-circuits may be controlled to be turned on according to actual storage requirements, thereby achieving the fast reading of the electrical signals by the signal receiving terminal D on a basis of meeting the requirement for the storage capacity of the electrical signals.

Figure 4:
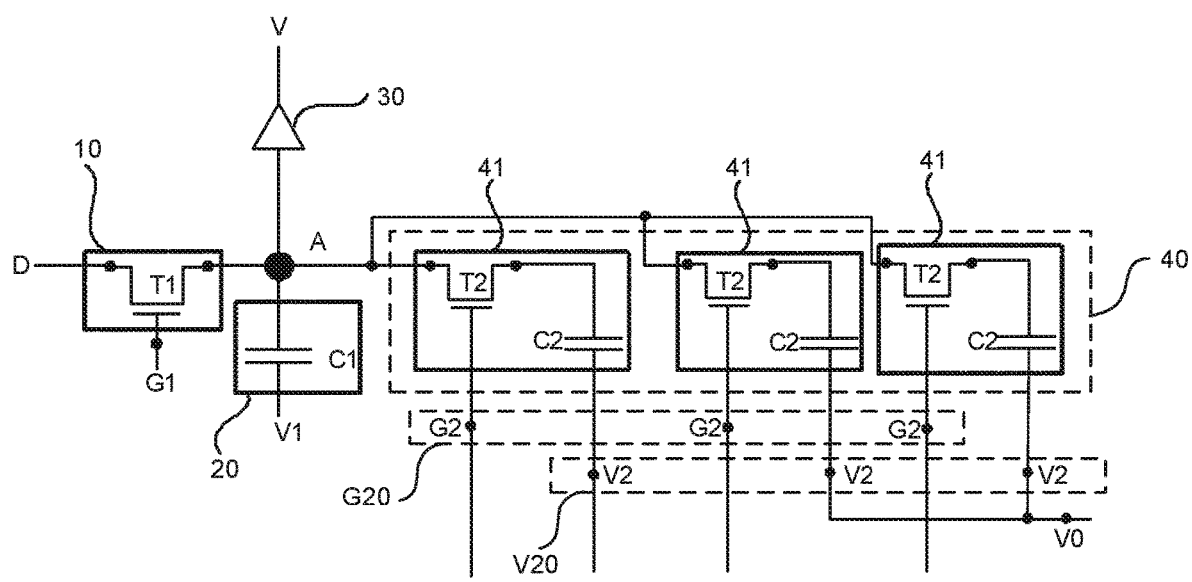
FIG. 4 is a schematic diagram showing structures of sub-circuits in another detection circuit, according to some embodiments of the present disclosure.

In some embodiments, as shown in FIG. 4, the second storage sub-circuit group 40 includes three second storage sub-circuits 41, the second voltage terminal group V20 includes three second voltage terminals V2, and the second control signal terminal group G20 includes three second control signal terminals G2. Each second storage sub-circuit 41 includes a second transistor T2 and a second capacitor C2.

In each second storage sub-circuit 41, a gate of the second transistor T2 is coupled to a corresponding second control signal terminal G2, a first electrode of the second transistor T2 is coupled to the output node A, a second electrode of the second transistor T2 is coupled to a first terminal of the second capacitor C2, and a second terminal of the second capacitor C2 is coupled to a corresponding second voltage terminal V2.

The three second control signal terminals G2 are different control signal terminals. A second voltage terminal V2 coupled to a 1st second storage sub-circuit 41 is a separate voltage terminal, and a second voltage terminal V2 coupled to a 2nd second storage sub-circuit 41 and a second voltage terminal V2 coupled to a 3th second storage sub-circuit 41 are further coupled to one voltage terminal V0.

In some embodiments, the second storage sub-circuit group 40 includes a plurality of second storage sub-circuits 41, the second voltage terminal group V20 includes a plurality of second voltage terminals V2, and the second control signal terminal group G20 includes a plurality of second control signal terminals G2. At least one of the plurality of second storage sub-circuits 41 includes a plurality of sub-banks 411 arranged in cascade. That is, the plurality of sub-banks 411 are connected in a manner similar to a series connection manner.

A first-stage sub-bank 411 is coupled to the output node A, a corresponding second voltage terminal V2 and a corresponding second control signal terminal G2, and is configured to store a part of the electrical signals from the output node A under control of a second turn-on signal transmitted through the corresponding second control signal terminal G2.

A sub-bank 411 in each stage after the first-stage sub-bank 411 is coupled to a previous-stage sub-bank 411, a corresponding second voltage terminal V2 and a corresponding second control signal terminal G2, and is configured to store a part of the electrical signals from the output node A under control of a second turn-on signal transmitted through the corresponding second control signal terminal G2.

As shown in FIG. 5, the second storage sub-circuit group 40 includes two second storage sub-circuits 41 (i.e., a 1st second storage sub-circuit 41 and a 2nd second storage sub-circuit 41). The 2nd second storage sub-circuit 41 includes three stages of sub-banks 411 arranged in cascade. A first-stage sub-bank 411 is coupled to a separate second voltage terminal V2, a second voltage terminal V2 coupled to a second-stage sub-bank of 411 and a second voltage terminal V2 coupled to a third-stage sub-bank 411 are further coupled to one voltage terminal V0. The first-stage sub-bank 411 is coupled to a separate second control signal terminal G2, a second control signal terminal G2 coupled to the second-stage sub-bank 411 and a second control signal terminal G2 coupled to the third-stage sub-bank 411 are further coupled to one control signal terminal G0.

In some embodiments, maximum amounts of charge that the plurality of sub-banks 411 are capable to store are the same, or not exactly the same. In some embodiments, the maximum amounts of the charge that the plurality of sub-banks 411 are capable to store are different.

In some embodiments, the second control signal terminal group G20 includes a plurality of second control signal terminals G2, and the plurality of second control signal terminals G2 may be input turn-on signals or turn-off signals at different time.

Here, the at least one second storage sub-circuit 41 is set to include the plurality of sub-banks 411 arranged in cascade. In this way, a storage capability of the detection circuit may be further expanded, and the fast reading of the electrical signals by the signal receiving terminal D is further achieved on the basis of meeting the requirement for the storage capacity of the electrical signals.

Figure 6:
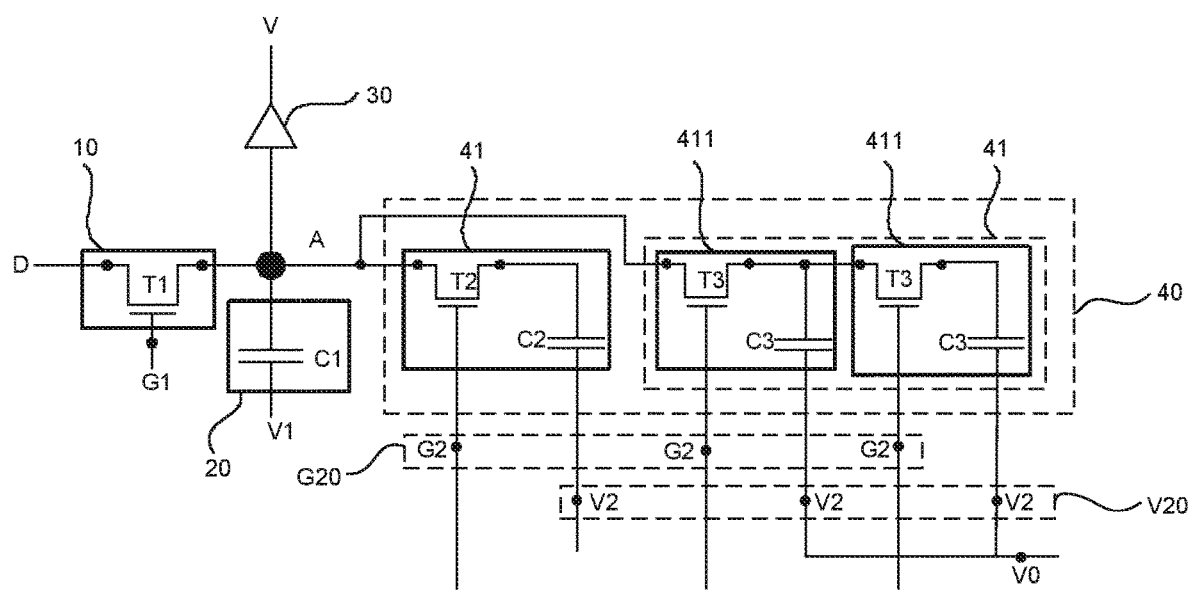
FIG. 6 is a schematic diagram showing structures of sub-circuits in yet another detection circuit, according to some embodiments of the present disclosure.

In some embodiments, as shown in FIG. 6, the second storage sub-circuit group 40 includes two second storage sub-circuits 41 (i.e., a 1st second storage sub-circuit 41 and a 2nd second storage sub-circuit 41). The 2nd second storage sub-circuit 41 includes two stages of sub-banks 411 arranged in cascade. The second voltage terminal group V20 includes three second voltage terminals V2, and the second control signal terminal group G20 includes three second control signal terminals G2. The 1st second storage sub-circuit 41 includes a second transistor T2 and a second capacitor C2. Each sub-bank 411 includes a third transistor T3 and a third capacitor C3.

A second control signal terminal G2 coupled to a gate of the second transistor T2 of the 1st second storage sub-circuit 41 and second control signal terminals G2 coupled to gates of the third transistors T3 of the two stages of sub-banks 411 are all different control signal terminals. A second terminal of the second capacitor C2 of the 1st second storage sub-circuit 41 is coupled to a separate second voltage terminal V2. Second voltage terminals V2 coupled to second terminals of the third capacitors C3 of the two stages of sub-banks 411 are further coupled to one voltage terminal V0.

In some embodiments, capacitances of a plurality of third capacitors C3 included in the plurality of sub-banks 411 are the same or not exactly the same.

In some embodiments, the second storage sub-circuit group 40 includes a plurality of second storage sub-circuits 41 arranged in cascade, the second voltage terminal group V20 includes a plurality of second voltage terminals V2, and the second control signal terminal group G20 includes a plurality of second control signal terminals G2.

A first-stage second storage sub-circuit 41 is coupled to the output node A, a corresponding second voltage terminal V2 and a corresponding second control signal terminal G2, and is configured to store a part of the electrical signals from the output node A under control of a second turn-on signal transmitted through the corresponding second control signal terminal G2.

A second storage sub-circuits 41 in each stage after the first-stage second storage sub-circuit 41 is coupled to a previous-stage second storage sub-circuit 41, a corresponding second voltage terminal V2 and a corresponding second control signal terminal G2, and is configured to store a part of the electrical signals from the output node A under control of a second turn-on signal transmitted through the corresponding second control signal terminal G2.

The plurality of second voltage terminals V2 and the first voltage terminal V1 may be further coupled to one voltage terminal or different voltage terminals.

As shown in FIG. 7, the second storage sub-circuit group 40 includes three stages of second storage sub-circuits 41 arranged in cascade. A first-stage second storage sub-circuit 41 is coupled to the output node A, a corresponding second voltage terminal V2 and a corresponding second control signal terminal G2. A second-stage second storage sub-circuit 41 is coupled to the first-stage second storage sub-circuit 41, a corresponding second voltage terminal V2 and a corresponding second control signal terminal G2. A third-stage second storage sub-circuit 41 is coupled to the second-stage second storage sub-circuit 41, a corresponding second voltage terminal V2 and a corresponding second control signal terminal G2. A second voltage terminal V2 coupled to the second-stage second storage sub-circuit 41 and a second voltage terminal V2 coupled to the third-stage second storage sub-circuit 41 are further coupled to one voltage terminal V0. A second control signal terminal G2 coupled to the second-stage second storage sub-circuit 41 and a second control signal terminal G2 coupled to the third-stage second storage sub-circuit 41 are further coupled to one control signal terminal G0. In some embodiments, maximum amounts of charge that the plurality of second storage sub-circuits 41 arranged in cascade are capable to store are the same. In some other embodiments, the maximum amounts of the charge that the plurality of second storage sub-circuits 41 arranged in cascade are capable to store are not exactly the same. The maximum amounts of the charge that the second storage sub-circuits 41 are capable to store may be adjusted according to design requirements of the detection circuit, and are not limited here.

In some embodiments of the present disclosure, the second storage sub-circuit group 40 is set to include a plurality of second storage sub-circuits 41 arranged in cascade. In this way, the detection circuit may meet the requirement for fast reading and the requirement for a large storage capacity of the electrical signals with a simple structure.

On this basis, in a case where the plurality of second storage sub-circuits 41 are respectively coupled to different second control signal terminals G2, first several stages of second storage sub-circuits 41 in the plurality of second storage sub-circuits 41 arranged in cascade may be controlled to be tuned on according to actual storage requirements. In this way, different storage requirements of the electrical signals may be met, and the fast reading of the electrical signals by the signal receiving terminal D may be achieved.

Figure 8:
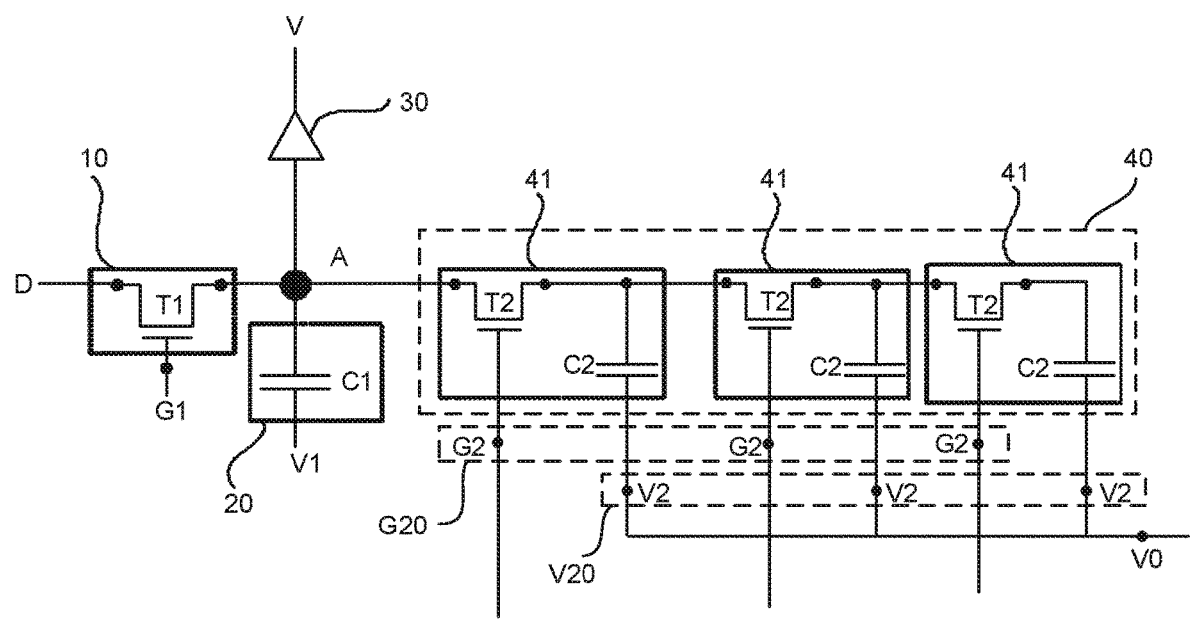
FIG. 8 is a schematic diagram showing structures of sub-circuits in yet another detection circuit, according to some embodiments of the present disclosure.

In some embodiments, as shown in FIG. 8, the second storage sub-circuit group 40 includes three stages of second storage sub-circuits 41 arranged in cascade, the second voltage terminal group V20 includes three second voltage terminals V2, and the second control signal terminal group G20 includes three second control signal terminals G2. Each second storage sub-circuit 41 includes a second transistor T2 and a second capacitor C2.

A second control signal terminal G2 coupled to a gate of the second transistor T2 of each second storage sub-circuit 41 is a different control signal terminal. Second voltage terminal V2 coupled to second terminals of the second capacitors C2 of the second storage sub-circuits 41 are further coupled to one voltage terminal V0.

In some embodiments, capacitances of the second capacitors C2 included in the plurality of second storage sub-circuits 41 are the same. In some other embodiments, the capacitances of the second capacitors C2 included in the plurality of second storage sub-circuits 41 are not exactly the same. The capacitance of each second capacitor C2 may be adjusted according to the design requirements of the detection circuit, and are not limited here.

It will be noted that, in a case where types of the transistors included in the sub-circuits in the embodiments of the present disclosure are not clearly limited, it means that, the types of the transistors may not be limited. That is to say, the first transistor T1, the second transistors T2 and the third transistors T3 may be N-type transistors or P-type transistors. In some embodiments, the transistors included in the detection circuit are all N-type transistors. The following embodiments of the present disclosure are described by taking an example in which the transistors are N-type transistors.

A first electrode of each transistor may be a drain, and a second electrode thereof may be a source. Or, a first electrode thereof may be a source, and a second electrode thereof may be a drain. Some embodiments of the present disclosure do not limit this.

In addition, the transistors in the detection circuit may be divided into enhancement-mode transistors and depletion-mode transistors according to different conduction manners of the transistors. Some embodiments of the present disclosure do not limit this.

Figure 9:
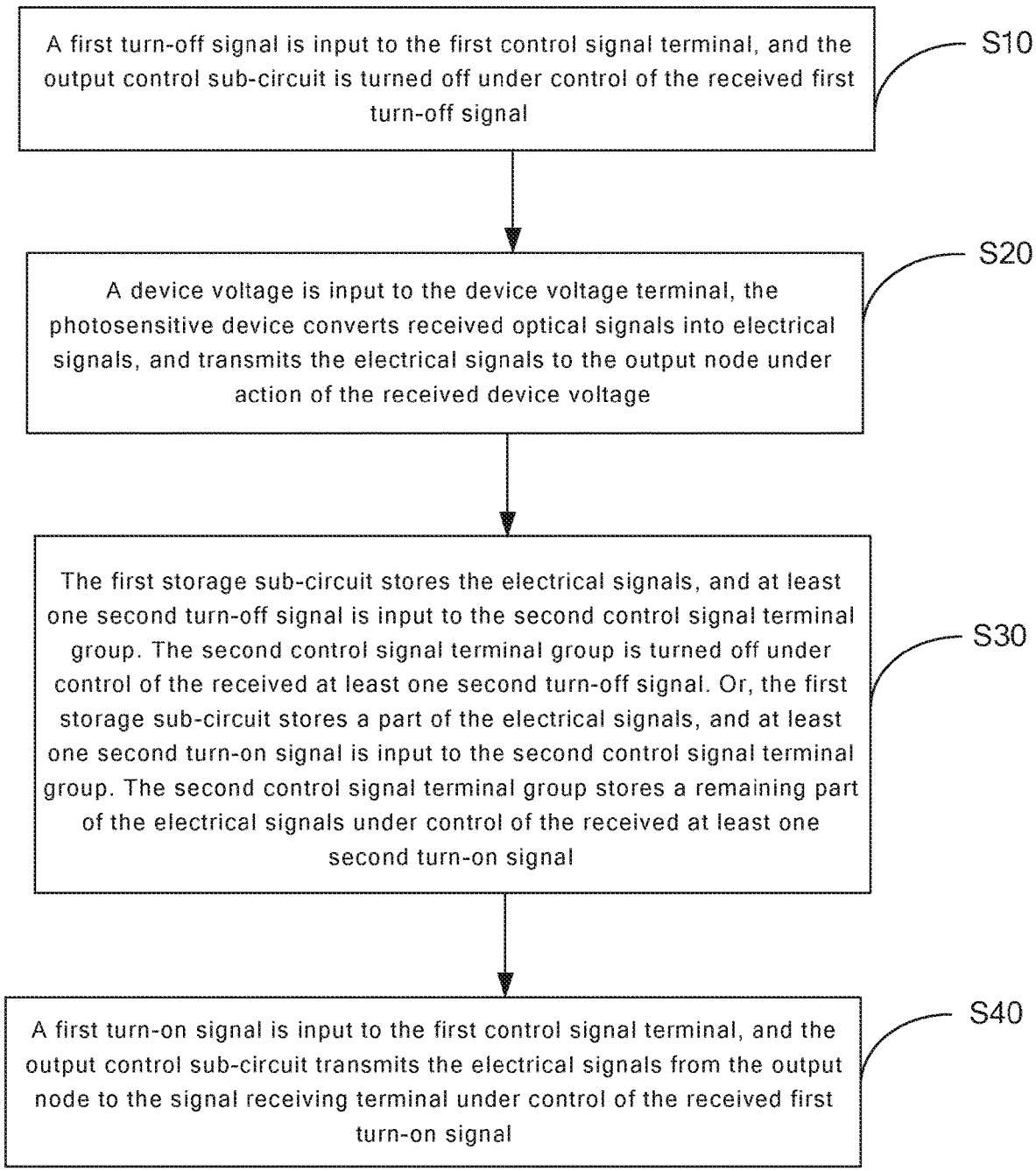
FIG. 9 is a flow diagram of a method for driving a detection circuit, according to some embodiments of the present disclosure.

Some embodiments of the present disclosure provide a method for driving a detection circuit. As shown in FIG. 9, the driving method includes the following steps.

In S10, a first turn-off signal is input to the first control signal terminal G1, and the output control sub-circuit 10 is turned off under control of the received first turn-off signal.

In S20, a device voltage is input to the device voltage terminal V, the photosensitive device 30 converts received optical signals into electrical signals, and transmits the electrical signals to the output node A under action of the received device voltage.

Figure 11:
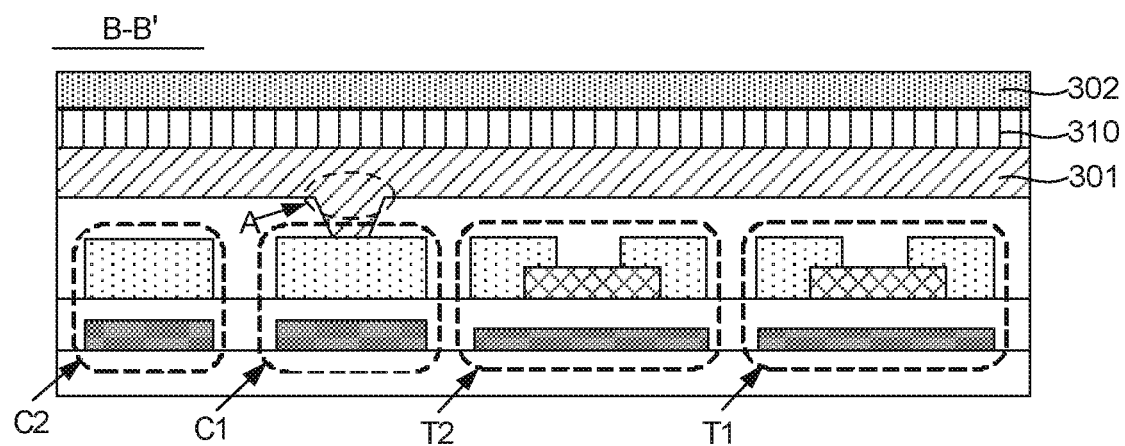
FIG. 11 is a schematic diagram showing a structure of a cross section of the detection circuit shown in FIG. 10 including a PIN photodiode taken along direction B-B'.
Figure 12:
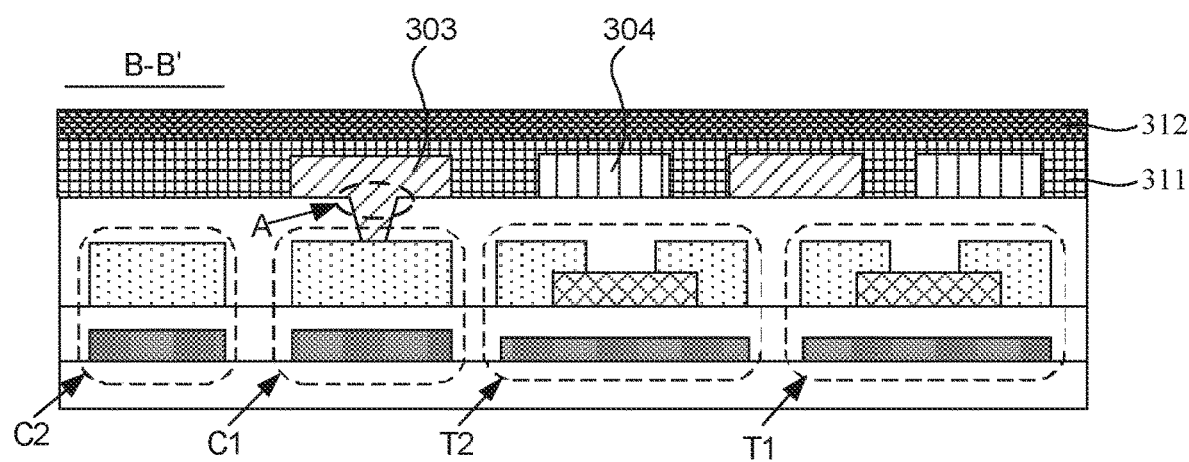
FIG. 12 is a schematic diagram showing a structure of a cross section of the detection circuit shown in FIG. 10 including an MSM photodiode taken along direction B-B'.

For example, the photosensitive device 30 may include a photodiode, which may be, a PIN photodiode (shown in FIG. 11), or an MSM photodiode (shown in FIG. 12). In a case where the device voltage is input to the device voltage terminal V, the photodiode converts the optical signals into the electrical signals and transmits the electrical signals to the output node A. FIG. 11 shows a PIN photodiode including a first electrode 301, a second electrode 302, and a PIN layer 310. The first electrode 301 is coupled to the output node A, and the second electrode 302 is coupled to the device voltage terminal V. The PIN layer 310 may be configured in a way that the optical signals are received by a P-type semiconductor or an N-type semiconductor in the PIN layer 310, which is not limited in the embodiments of the present disclosure. FIG. 12 shows a MSM photodiode including a third electrode 303, a fourth electrode 304, an insulating layer 311, and a semiconductor layer 312. The insulating layer 311 may be made of an insulating material such as polyimide (PI) and polyolefin. The semiconductor layer 312 may be made of a semiconductor material such as amorphous silicon (a-Si) and indium gallium zinc oxide (IGZO). The third electrode 303 is coupled to the output node A, and the fourth electrode 304 is coupled to the device voltage terminal V. The third electrode 303 and the fourth electrode 304 may be interdigital electrodes and are matched with each other. Or, the third electrode 303 and the fourth electrode 304 are configured to have other shapes according to actual needs, which is not limited in the embodiments of the present disclosure.

In S30, the first storage sub-circuit 20 stores the electrical signals and at least one second turn-off signal is input to the second control signal terminal group 40. The second control signal terminal group 40 is turned off under control of the received at least one second turn-off signal. Or, the first storage sub-circuit 20 stores a part of the electrical signals and at least one second turn-on signal is input to the second control signal terminal group 40. The second control signal terminal group 40 stores a remaining part of the electrical signals under control of the received at least one second turn-on signal.

That is to say, the first storage sub-circuit 20 is bound to store at least a part of the electrical signals from the output node A. However, the second storage sub-circuit group 40 may do not work. In a case where the maximum amount of charge that the first storage sub-circuit 20 is capable to store meets the storage requirements, the at least one second turn-off signal may be input to the second control signal terminal group G20 to turn off the second storage sub-circuit group 40. In this case, the first storage sub-circuit 20 stores all the electrical signals. In a case where the maximum amount of the charge that the first storage sub-circuit 20 is capable to store cannot meet the storage requirements, the at least one second turn-on signal is input to the second control signal terminal group G20, and the second storage sub-circuit group 40 stores a part of the electrical signals under control of the at least one second turn-on signal. In this case, the first storage sub-circuit 20 stores a part of the electrical signals from the output node A, and the second storage sub-circuit group 40 stores the remaining part of the electrical signals from the output node A.

In S40, a first turn-on signal is input to the first control signal terminal G1, and the output control sub-circuit 10 transmits the electrical signals from the output node A to the signal receiving terminal D under control of the received first turn-on signal.

The electrical signals read by the signal reading terminal D may be a potential difference between the signal reading terminal D and the output node A, or a total amount of charge at the output node A.

In addition, a person skilled in the art will understand that, in order to ensure an accuracy of the read electrical signals, in a process of reading the electrical signals, a supply of light to the detection circuit should be stopped. The photosensitive device 30 does not convert the optical signals into the electrical signals during this process.

A signal input to a second control signal terminal G2 in the second control signal terminal group G20 in the process of storing the electrical signals is the same as a signal input to the second control signal terminal G2 in the second control signal terminal group G20 in the process of reading the electrical signals.

The description that a signal input to a second control signal terminal G2 in the second control signal terminal group G20 in the process of storing the electrical signals is the same as a signal input to the second control signal terminal G2 in the second control signal terminal group G20 in the process of reading the electrical signals means that, if a second turn-on signal is input to a second control signal terminal G2 in the process of storing the electrical signals, and the second turn-on signal is still input to the second control signal terminal G2 in the process of reading the electrical signals; and if a second turn-off signal is input to a second control signal terminal G2 in the process of storing the electrical signals, and the second turn-off signal is still input to the second control signal terminal G2 in the process of reading the electrical signals.

The second turn-on signal and the second turn-off signal input to the second control signal terminal may be voltage signals, one of which is a positive voltage and the other of which is a negative voltage. Absolute values of the positive voltage and the negative voltage may be the same or different, and may be set according to characteristics of switches to be controlled in the circuit.

In some embodiments, in the process of reading the electrical signals, in order to ensure the accuracy of the read electrical signals, the device voltage is continuously input to the device voltage terminal V until the electrical signals are all read. In some embodiments, the step of storing, by the first storage sub-circuit 20, all the electrical signals, and inputting, at least one second turn-off signal to the second control signal terminal group 40, and the second storage sub-circuit group 40 being turned off under control of the received at least one second turn-off signal, includes: in a case where an amount of charge of the electrical signals generated by the photosensitive device 30 is less than or equal to the maximum amount of the charge that the first storage circuit 20 is capable to store, inputting at least one second turn-off signal to the second control signal terminal group 40, and the second storage sub-circuit group 40 being turned off under control of the received at least one second turn-off signal. The step of storing, by the first storage sub-circuit 20, a part of the electrical signals, and inputting, at least one second turn-on signal to the second control signal terminal group 40, and storing, by the second storage sub-circuit group 40, a remaining part of the electrical signals under control of the received at least one second turn-on signal, includes: in a case where the amount of the charge of the electrical signals generated by the photosensitive device 30 is greater than the maximum amount of the charge that the first storage sub-circuit 20 is capable to store, inputting at least one second turn-on signal to the second control signal terminal group 40, and storing, by the second storage sub-circuit group 40, a remaining part of the electrical signals under control of the received at least one second turn-on signal.

Beneficial effects of the method for driving the detection circuit provided by the embodiments of the present disclosure are the same as those of the detection circuit, which are not be described herein again.

For example, taking the detection circuit shown in FIG. 2 as an example, S10 includes: inputting a first turn-off signal to the first control signal terminal G1, and the first transistor T1 being turned off under control of the first turn-off signal.

S20 includes: inputting a device voltage to the device voltage terminal V, and converting, by the photosensitive device 30, received optical signals into electrical signals, and transmitting, by the photosensitive device 30, the electrical signals to the output node A under action of the received device voltage.

S30 includes: storing, by the first capacitor C1, a part of the electrical signals from the output node A, inputting a second turn-on signal to the second control signal terminal G2, the second transistor T2 being turned on, and storing, by the second capacitor C2, a remaining part of the electrical signals from the output node A; or storing, by the first capacitor C1, all the electrical signals from the output node A, inputting a second turn-off signal to the second control signal terminal G2, the second transistor T2 being turned off, and not storing, by the second capacitor C2, the electrical signals from the output node A.

S40 includes: inputting a first turn-on signal to the first control signal terminal G1, and transmitting, by the first transistor T1, the electrical signals from the output node A to the signal receiving terminal D under control of the first turn-on signal.

In some embodiments, the second control signal terminals G2 in the second control signal terminal group G20 of the detection circuit are further coupled to one control signal terminal. S30 includes: inputting second turn-on signal(s) to the second control signal terminal group G20, and storing, by the second storage sub-circuit group 40, a remaining part of the electrical signals under control of the second turn-on signal(s); or inputting second turn-off signal(s) to the second control signal terminal group G20, and the second storage sub-circuit group 40 being turned off under control of the second turn-off signal(s).

That is to say, in this case, whether the second storage sub-circuit group 40 includes a plurality of second storage sub-circuits 41 directly coupled to the output node A, or the second storage sub-circuit group 40 includes a plurality of second storage sub-circuits 41 arranged in cascade, or at least one of the plurality of second storage sub-circuits 41 directly coupled to the output node A includes a plurality of sub-banks 411 arranged in cascade, in a case where the second turn-on signal(s) are input to the second control signal terminal group G20, the second storage sub-circuits 41 in the second storage sub-circuit group 40 included in the detection circuit are each turned on, and in a case where the second turn-off signal(s) are input to the second control signal terminal group G20, the second storage sub-circuits 41 in the second storage sub-circuit group 40 included in the detection circuit are each turned off.

In some embodiments, the second storage sub-circuit group 40 includes a plurality of second storage sub-circuits 41 directly coupled to the output node A. S30 includes: inputting second turn-on signal(s) to at least one of the plurality of second control signal terminals G2 in the second control signal terminal group G20; or inputting a second turn-off signal to each second control signal terminal G2 in the second control signal terminal group G20.

For example, taking the detection circuit shown in FIG. 4 as an example, the second storage sub-circuit group 40 includes three second storage sub-circuits 41 directly coupled to the output node A. In a case where the 1st second storage sub-circuit 41 is controlled to be turned on, and the 2nd second storage sub-circuit 41 and the 3th second storage sub-circuit 41 are controlled to be turned off in the process of driving the detection circuit, 330 includes: inputting a second turn-on signal to a second control signal terminal G2 coupled to the 1st second storage sub-circuit 41, a second transistor T2 in the first second storage sub-circuit 41 being turned on, and storing, by a second capacitor C2 in the first second storage sub-circuit 41, a remaining part of the electrical signals from the output node A; and inputting second turn-off signals to a second control signal terminal G2 coupled to the 2nd second storage sub-circuit 41 and a second control signal terminal G2 coupled to the 3th second storage sub-circuit 41, and a second transistor T2 in the 2nd second storage sub-circuit 41 and a second transistor T2 in the 3th second storage sub-circuit 41 being turned off.

In some embodiments, at least one of the plurality of second storage sub-circuits 41 directly coupled to the output node A includes a plurality of sub-banks 411 arranged in cascade. In a case where the second control signal terminals G2 coupled to the plurality of sub-banks 411 are further coupled to one control signal terminal, the plurality of sub-banks 411 may be simultaneously turned on or turned off. In a case where the second control signal terminals G2 coupled to the plurality of sub-banks 411 are coupled to different control signal terminals, sub-banks 411 in first several stages in the plurality of sub-banks 411 arranged in cascade may be controlled to be simultaneously turned on as needed, or a sub-bank 411 in a certain stage in the plurality of sub-banks 411 arranged in cascade may be controlled to be turned off (or a sub-bank 411 in a certain stage and sub-banks 411 in a plurality of stages after the sub-bank 411 in the certain stage in the plurality of sub-banks 411 may be controlled to be simultaneously turned off).

It will be understood that, in a case where a sub-bank 411 in a certain stage in the plurality of sub-banks 411 arranged in cascade is controlled to be turned off, after the sub-bank 411 in the certain stage is controlled to be turned off, sub-bank(s) 411 after the sub-bank 411 in the certain stage are each turned off. In a case where sub-banks 411 in first several stages in the plurality of sub-banks 411 arranged in cascade are controlled to be simultaneously turned on, second turn-on signals are provided to second control signal terminals G2 coupled to the sub-banks 411 in the first several stages.

In some embodiments, the second storage sub-circuit group 40 includes a plurality of second storage sub-circuits 41 arranged in cascade. S30 includes: inputting second turn-on signals to a second control signal terminal G2 coupled to a present-stage second storage sub-circuit 41 and a second control signal terminal G2 coupled to a second storage sub-circuit 41 in each stage before the present-stage second storage sub-circuit 41, and in second storage sub-circuits 41 in stages after the present-stage second storage sub-circuit 41, at least inputting a second turn-off signal to a second control signal terminal G2 coupled to a next-stage second storage sub-circuit 41 adjacent to the present-stage second storage sub-circuit 41; or, at least inputting a second turn-off signal to a second control signal terminal G2 coupled to a second storage sub-circuit 41 in a first stage.

In some examples, the step of at least inputting a second turn-off signal to a second control signal terminal G2 coupled to a second storage sub-circuit 41 in a first stage means, only inputting a second turn-off signal to the second control signal terminal G2 coupled to the second storage sub-circuit 41 in the first stage. In some other examples, the step of at least inputting a second turn-off signal to a second control signal terminal G2 coupled to a second storage sub-circuit 41 in a first stage means, inputting second turn-off signals to the second control signal terminal G2 coupled to the second storage sub-circuit 41 in the first stage and a second control signal terminal G2 coupled to a second storage sub-circuit 41 in a second stage. In yet some other examples, the step of at least inputting a second turn-off signal to a second control signal terminal G2 coupled to a second storage sub-circuit 41 in a first stage means, inputting a second turn-off signal to a second control signal terminal G2 coupled to a second storage sub-circuits 41 in each stage.

It will be understood that, in a case where a second storage sub-circuit 41 in a certain stage in the plurality of second storage sub-circuits 41 arranged in cascade is controlled to be turned off, after the second storage sub-circuit 41 in the certain stage is controlled to be turned off, second storage sub-circuit(s) 41 after the second storage sub-circuit 41 in the certain stage are each turned off. In a case where second storage sub-circuits 41 in first several stages in the plurality of second storage sub-circuits 41 arranged in cascade are controlled to be simultaneously turned on, second turn-on signals are provided to second control signal terminals G2 coupled to the second storage sub-circuits 41 in the first several stages.

For example, taking the detection circuit shown in FIG. 8 as an example, the second storage sub-circuit group 40 includes three stages of second storage sub-circuits 41 arranged in cascade. In a case where a second storage sub-circuit 41 in a first stage and a second storage sub-circuit 41 in a second stage are controlled to be turned on, and a second storage sub-circuit 41 in a third stage is controlled to be turned off in the process of driving the detection circuit, S30 includes: inputting second turn-on signals to a second control signal terminal G2 coupled to the second storage sub-circuit 41 in the first stage and a second control signal terminal G2 coupled to the second storage sub-circuit 41 in the second stage, a second transistors T2 in the second storage sub-circuit 41 in the first stage and a second transistors T2 in the second storage sub-circuit 41 in the second stage being turned on, storing, by a second capacitor C2 in the second storage sub-circuit 41 in the first stage and a second capacitor C2 in the second storage sub-circuit 41 in the second stage, a remaining part of the electrical signals from the output node A, and inputting a second turn-off signal to a second control signal terminal G2 coupled to the second storage sub-circuit 41 in the third stage, and a second transistor T2 in the second storage sub-circuit 41 in the third stage being turned off.

Some embodiments of the present disclosure provide a detection substrate including a plurality of detection circuits described above.

The plurality of detection circuits may be arranged in an array. For example, the plurality of detection circuits are configured in a way that first control signal terminals G1 of detection circuits in a same row are coupled to a same control signal terminal, second control signal terminals G2 of the detection circuits in the same row are coupled to a same control signal terminal, and signal receiving terminals D of detection circuits in a same column are coupled to a same signal receiving terminal. An area of a detection circuit may be, for example, 100 μm×100 μm, and a width-to-length ratio of a channel of a transistor in the detection circuit may be, for example, 17/4 μm.

The detection substrate provided by the embodiments of the present disclosure may also be used in cooperation with a signal conversion device and a display panel. For example, the signal conversion device may convert the electrical signals read by the signal reading terminals of the detection circuits in the detection substrate into gray-scale voltages, and drive pixels in the display panel to emit light, thereby displaying an image.

The detection substrate provided by the embodiments of the present disclosure includes any of the above detection circuits. Beneficial effects of the detection substrate are the same as those of the detection circuit, which are not described herein again.

Figure 10:
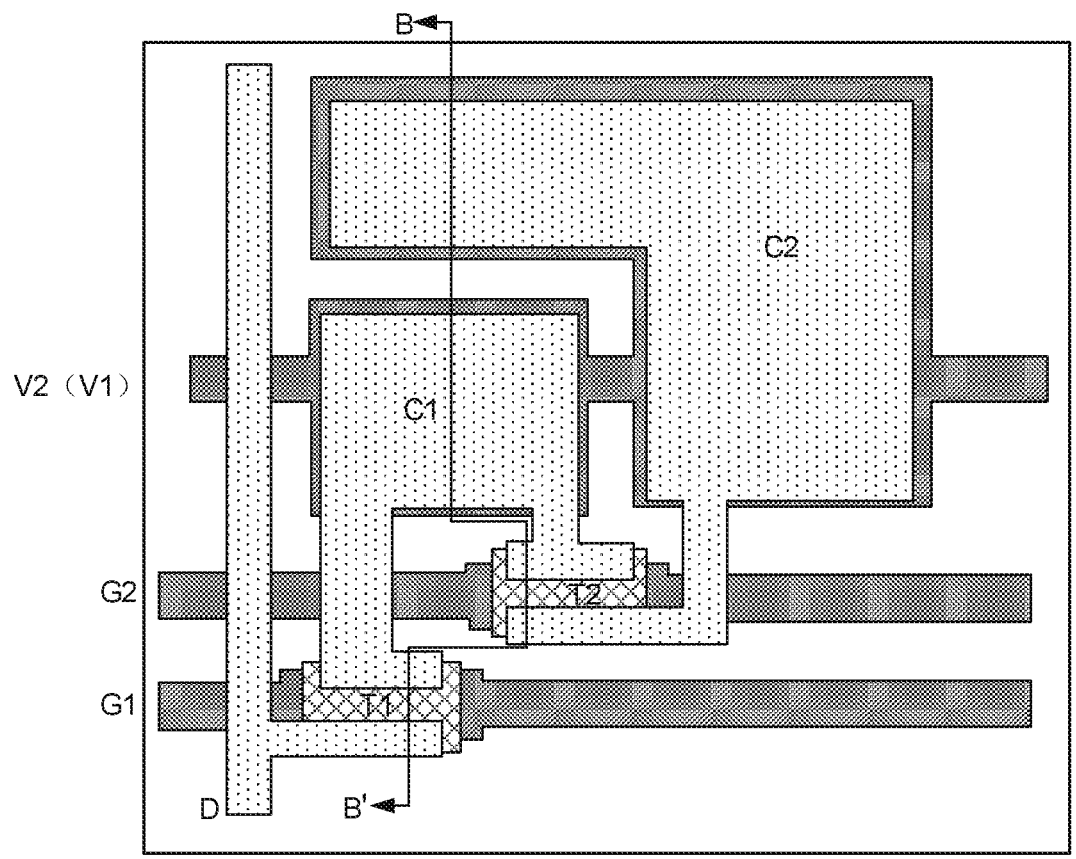
FIG. 10 is a schematic diagram showing an arrangement of sub-circuits in a detection circuit, according to some embodiments of the present disclosure.

In some embodiments, as shown in FIG. 10, the second storage sub-circuit group 40 includes one second storage sub-circuit 41, the second storage sub-circuit 41 includes a second capacitor C2, and the first storage sub-circuit 20 includes a first capacitor C1. As shown in FIG. 11 or 12, a second terminal of the second capacitor C2 and a second terminal of the first capacitor C1 are disposed in a same layer and made of a same material.

The description that a second terminal of the second capacitor C2 and a second terminal of the first capacitor C1 are disposed in a same layer and made of a same material means that, the second terminal of the second capacitor C2 and the second terminal of the first capacitor C1 are formed by using a same mask through a same patterning process.

The patterning process includes a photolithography process, or a process including a photolithography process and an etching step. The photolithography process refers to a process of forming a pattern by using a photoresist, a mask, and an exposure machine. The photolithography process includes film formation (e.g., chemical vapor deposition, (CVD)), exposure, and development, for example, depositing a metal film (e.g., Cu, Al and other metals), depositing the photoresist, forming a photoresist pattern by using a single mask, exposing the metal film below, etching the exposed metal film to form various metal patterns, and removing a remaining photoresist by using, for example, an ashing process.

In some embodiments, as shown in FIG. 10, the second storage sub-circuit group 40 includes one second storage sub-circuit 41, the second storage sub-circuit 41 includes a second capacitor C2, and the first storage sub-circuit 20 includes a first capacitor C1. As shown in FIG. 11 or 12, a first terminal of the second capacitor C2 and a first terminal of the first capacitor C1 are disposed in a same layer and made of a same material.

In some embodiments, as shown in FIG. 10, the second storage sub-circuit group 40 includes one second storage sub-circuit 41, the second storage sub-circuit 41 includes a second transistor T2 and a second capacitor C2, the output control sub-circuit 10 includes a first transistor T1, and the first storage sub-circuit 20 includes a first capacitor C1. As shown in FIG. 11 or 12, a gate of the second transistor T2, a gate of the first transistor T1, a second terminal of the second capacitor C2 and a second terminal of the first capacitor C1 are disposed in a same layer and made of a same material.

In some embodiments, as shown in FIG. 10, the second storage sub-circuit group 40 includes one second storage sub-circuit 41, the second storage sub-circuit 41 includes a second transistor T2 and a second capacitor C2, the output control sub-circuit 10 includes a first transistor T1, and the first storage sub-circuit 20 includes a first capacitor C1. As shown in FIG. 11 or 12, a first electrode and a second electrode of the second transistor T2, a first electrode and a second electrode of the first transistor T1, a first terminal of the second capacitor C2 and a first terminal of the first capacitor C1 are disposed in a same layer and made of a same material.

FIG. 10 only shows an arrangement of sub-circuits in a detection circuit, and does not limit the detection circuit in the embodiments of the present disclosure. The detection circuit of the present disclosure may be reasonably designed according to actual needs.

In some embodiments, the second storage sub-circuit group 40 includes a plurality of second storage sub-circuits 41 directly coupled to the output node A. Each second storage sub-circuit includes a second transistor T2 and a second capacitor C2. The output control sub-circuit 10 includes a first transistor T1, and the first storage sub-circuit 20 includes a first capacitor C1. A gate of the second transistor T2, a gate of the first transistor T1, a second terminal of the second capacitor C2 and a second terminal of the first capacitor C1 are disposed in a same layer and made of a same material. A first electrode and a second electrode of the second transistor T2, a first electrode and a second electrode of the first transistor T1, a first terminal of the second capacitor C2 and a first terminal of the first capacitor C1 are disposed in a same layer and made of a same material.

In some embodiments, the second storage sub-circuit group 40 includes a plurality of second storage sub-circuits 41 directly coupled to the output node A. Each of a part of the second storage sub-circuits 41 includes a plurality of sub-banks 411 arranged in cascade. Each sub-bank 411 includes a third transistor T3 and a third capacitor C3, and each of a remaining part of the second storage sub-circuits 41 includes a second transistor T2 and a second capacitor C2. The output control sub-circuit 10 includes a first transistor T1, and the first storage sub-circuit 20 includes a first capacitor C1. A gate of the second transistor T2, a gate of the third transistor T3, a gate of the first transistor T1, a second terminal of the second capacitor C2, a second terminal of the third capacitor C3 and a second terminal of the first capacitor C1 are disposed in a same layer and made of same material. A first electrode and a second electrode of the second transistor T2, a first electrode and a second electrode of the third transistor T3, a first electrode and a second electrode of the first transistor T1, a first terminal of the second capacitor C2, a first terminal of the third capacitor C3 and a first terminal of the first capacitor C1 are disposed in a same layer and made of a same material.

The gates of the transistors and the second terminals of the capacitors in the second storage sub-circuit group 40, the gate of the transistor in the output control sub-circuit 10, and the second terminal of the capacitor in the first storage sub-circuit 20 are all disposed in the same layer and made of the same material. The first electrodes and the second electrodes of the transistors and the first terminals of the capacitors in the second storage sub-circuit group 40, the first electrode and the second electrode of the transistor in the output control sub-circuit 10, and the first terminal of the capacitor in the first storage sub-circuit 20 are all disposed in the same layer and made of the same material. In this way, a manufacturing process may be simplified, costs may be saved, and the detection substrate may be made very thin and light.

Some embodiments of the present disclosure provide a detection device including any of the above detection substrates. Beneficial effects of the detection device are the same as the beneficial effects of the detection substrate, which are not be described herein again.

For example, the detection device may be an a-Si X-ray detector, which is an X-ray image detector with a plurality of a-Si photodiodes arranged in an array as a core. Firstly, X-rays are converted into visible light, then the a-Si photodiodes arranged in the array generate photo-generated electrons under action of the visible light, and then an image is formed by detecting a change of electrical signals of the photo-generated electrons and analyzing the read signals.

In some embodiments, a mode of inputting signals of the detection circuit may be set according to actual needs. Taking the detection circuit shown in FIG. 1 as an example, mode 1 is to input a second turn-on signal to the second control signal terminal G2 to control the second storage sub-circuit 41 to be turned on, and mode 2 is to input a second turn-off signal to the second control signal terminal G2 to control the second storage sub-circuit 41 to be turned off.

In some embodiments, as shown in FIG. 3, the detection device further includes a processor 50, which may be coupled to the output node A. The processor 50 is configured to input at least one second turn-on signal to the second control signal terminal group 40 in the case where the amount of the charge of the electrical signals generated by the photosensitive device 30 is greater than the maximum amount of the charge that the first storage sub-circuit 20 is capable to store, so as to turn on the second storage sub-circuit group 40 to storage a part of the electrical signals. And, the processor 50 is further configured to input at least one second turn-off signal to the second control signal terminal group 40 in the case where the amount of the charge of the electrical signals generated by the photosensitive device 30 is less than or equal to the maximum amount of the charge that the first storage sub-circuit 20 is capable to store, so as to turn off the second storage sub-circuit group 40.

For example, the processor 50 may detect an amount of charge of the electrical signals from the output node A and compare it with the known maximum amount of the charge that the first storage sub-circuit 20 is capable to store. In a case where the amount of the charge of the electrical signals from the output node A is greater than the maximum amount of the charge that the first storage sub-circuit 20 is capable to store, at least one second turn-on signal is input to the second control signal terminal group 40 to turn on the second storage sub-circuit group 40 and store a part of the electrical signals. In a case where the amount of the charge of the electrical signals from the output node A is less than or equal to the maximum amount of the charge that the first storage sub-circuit 20 is capable to store, at least one second turn-off signal is input to the second control signal terminal group 40 to turn off the second storage sub-circuit group 40.

In this way, an intelligent control of the detection device may be achieved. The second storage sub-circuit group 40 is intelligently controlled to be turned on or turned off by dynamically monitoring the amount of the charge of the electrical signals from the output node A.

The forgoing descriptions are merely specific implementation manners of the present disclosure, but the protection scope of the present disclosure is not limited thereto. Any person skilled in the art could readily conceive of changes or replacements within the technical scope of the present disclosure, which shall all be included in the protection scope of the present disclosure.

What is claimed is:

1. A detection circuit, comprising: an output control sub-circuit, a first storage sub-circuit, a photosensitive device, and a second storage sub-circuit group; wherein
the photosensitive device is coupled to a device voltage terminal and an output node, and is configured to convert received optical signals into electrical signals and to transmit the electrical signals to the output node under action of a device voltage transmitted through the device voltage terminal;
the first storage sub-circuit is coupled to the output node and a first voltage terminal, and is configured to store at least a part of the electrical signals;
the second storage sub-circuit group is coupled to the output node, a second voltage terminal group and a second control signal terminal group, and is configured to store a part of the electrical signals under control of at least one second turn-on signal transmitted through the second control signal terminal group; and
the output control sub-circuit is coupled to a signal receiving terminal, a first control signal terminal, and the output node, and is configured to transmit the electrical signals from the output node to the signal receiving terminal under control of a first turn-on signal transmitted through the first control signal terminal.

2. The detection circuit according to claim 1, wherein the second storage sub-circuit group includes one second storage sub-circuit, the second voltage terminal group includes one second voltage terminal, and the second control signal terminal group includes one second control signal terminal; and
the second storage sub-circuit is configured to store the part of the electrical signals under control of a second turn-on signal transmitted through the second control signal terminal.

3. The detection circuit according to claim 1, wherein the second storage sub-circuit group includes a plurality of second storage sub-circuits, the second voltage terminal group includes a plurality of second voltage terminals, and the second control signal terminal group includes a plurality of second control signal terminals; and
each second storage sub-circuit is coupled to the output node, a corresponding second voltage terminal, and a corresponding second control signal terminal, and is configured to store a part of the electrical signals under control of a second turn-on signal transmitted through the corresponding second control signal terminal.

4. The detection circuit according to claim 1, wherein the second storage sub-circuit group includes a plurality of second storage sub-circuits, the second voltage terminal group includes a plurality of second voltage terminals, and the second control signal terminal group includes a plurality of second control signal terminals;
each of a part of the plurality of second storage sub-circuits includes a plurality of sub-banks arranged in cascade;
a first-stage sub-bank is coupled to the output node, a corresponding second voltage terminal, and a corresponding second control signal terminal, and is configured to store a part of the electrical signals under control of a second turn-on signal transmitted through the corresponding second control signal terminal;

a sub-bank in each stage after the first-stage sub-bank is coupled to a previous-stage sub-bank, a corresponding second voltage terminal, and a corresponding second control signal terminal, and is configured to store a part of the electrical signals under control of a second turn-on signal transmitted through the corresponding second control signal terminal; and each of a remaining part of the plurality of second storage sub-circuits is coupled to the output node, a corresponding second voltage terminal, and a corresponding second control signal terminal, and is configured to store a part of the electrical signals under control of a second turn-on signal transmitted through the corresponding second control signal terminal.

5. The detection circuit according to claim 1, wherein the second storage sub-circuit group includes a plurality of second storage sub-circuits arranged in cascade, the second voltage terminal group includes a plurality of second voltage terminals, and the second control signal terminal group includes a plurality of second control signal terminals;

a first-stage second storage sub-circuit is coupled to the output node, a corresponding second voltage terminal, and a corresponding second control signal terminal, and is configured to store a part of the electrical signals under control of a second turn-on signal transmitted through the corresponding second control signal terminal; and a second storage sub-circuit in each stage after the first-stage second storage sub-circuit is coupled to a previous-stage second storage sub-circuit, a corresponding second voltage terminal, and a corresponding second control signal terminal, and is configured to store a part of the electrical signals under control of a second turn-on signal transmitted through the corresponding second control signal terminal.

6. The detection circuit according to claim 1, wherein a maximum amount of charge that the first storage sub-circuit is capable to store is different from a maximum amount of charge that the second storage sub-circuit group is capable to store.

7. The detection circuit according to claim 3, wherein maximum amounts of charge that at least two of the plurality of second storage sub-circuits are capable to store are different.

8. The detection circuit according to claim 1, wherein the photosensitive device includes a photodiode, one electrode of the photodiode is coupled to the device voltage terminal, and another electrode of the photodiode is coupled to the output node;

the first storage sub-circuit includes a first capacitor, a first electrode of the first capacitor is coupled to the output node, and a second electrode of the first capacitor is coupled to the first voltage terminal; and the output control sub-circuit includes a first transistor, a gate of the first transistor is coupled to the first control signal terminal, a first electrode of the first transistor is coupled to the signal receiving terminal, and a second electrode of the first transistor is coupled to the output node.

9. The detection circuit according to claim 2, wherein the second storage sub-circuit includes a second transistor and a second capacitor; a gate of the second transistor is coupled to the second control signal terminal, a first electrode of the second transistor is coupled to the output node, and a second electrode of the second transistor is coupled to a first electrode of the second capacitor; and a second electrode of the second capacitor is coupled to the second voltage terminal.

10. The detection circuit according to claim 3, wherein each second storage sub-circuit includes a second transistor and a second capacitor; and a gate of the second transistor of each second storage sub-circuit is coupled to a corresponding second control signal terminal, a first electrode of the second transistor is coupled to the output node, and a second electrode of the second transistor is coupled to a first electrode of the second capacitor in a same second storage sub-circuit; and a second electrode of the second capacitor of each second storage sub-circuit is coupled to a corresponding second voltage terminal.

11. The detection circuit according to claim 4, wherein each sub-bank includes a third transistor and a third capacitor;

in the first-stage sub-bank:
a gate of a third transistor is coupled to a corresponding second control signal terminal, a first electrode of the third transistor is coupled to the output node, and a second electrode of the third transistor is coupled to a first electrode of a third capacitor; and a second electrode of the third capacitor is coupled to a corresponding second voltage terminal; and in the sub-bank in each stage after the first-stage sub-bank:
a gate of a third transistor is coupled to a corresponding second control signal terminal, a first electrode of the third transistor is coupled to a second electrode of a third transistor of a previous-stage sub-bank, and a second electrode of the third transistor is coupled to a first electrode of a third capacitor; and a second electrode of the third capacitor is coupled to a corresponding second voltage terminal; and each of the remaining part of the plurality of second storage sub-circuits includes a second transistor and a second capacitor; wherein a gate of the second transistor is coupled to a corresponding second control signal terminal, a first electrode of the second transistor is coupled to the output node, and a second electrode of the second transistor is coupled to a first electrode of the second capacitor in a same second storage sub-circuit; and a second electrode of the second capacitor is coupled to a corresponding second voltage terminal.

12. The detection circuit according to claim 5, wherein each second storage sub-circuit includes a second transistor and a second capacitor;

in the first-stage second storage sub-circuit:
a gate of a second transistor is coupled to a corresponding second control signal terminal, a first electrode of the second transistor is coupled to the output node, and a second electrode of the second transistor is coupled to a first electrode of a second capacitor; and a second electrode of the second capacitor is coupled to a corresponding second voltage terminal; and in the second storage sub-circuit in each stage after the first-stage second storage sub-circuit:
a gate of a second transistor is coupled to a corresponding second control signal terminal, a first electrode of the second transistor is coupled to a second electrode of a second transistor of a previous-stage second storage sub-circuit, and a second electrode of the second transistor is coupled to a first electrode of a second capacitor; and a second electrode of the second capacitor is coupled to a corresponding second voltage terminal.

13. A detection substrate, comprising a plurality of detection circuits according to claim 1.

14. The detection substrate according to claim 13, wherein the first storage sub-circuit includes a first capacitor; and the second storage sub-circuit group includes at least one second storage sub-circuits, and each second storage sub-circuit includes a second capacitor; wherein
a second electrode of the first capacitor and a second electrode of the second capacitor are disposed in a same layer and made of a same material, or
a first electrode of the first capacitor and a first electrode of the second capacitor are disposed in a same layer and made of a same material, or
a second electrode of the first capacitor and a second electrode of the second capacitor are disposed in a same layer and made of a same material, and a first electrode of the first capacitor and a first electrode of the second capacitor are disposed in a same layer and made of a same material.

15. The detection substrate according to claim 14, wherein the first storage sub-circuit further includes a first transistor; and each second storage sub-circuit further includes a second transistor; wherein
a gate of the first transistor, a gate of the second transistor, the second electrode of the first capacitor, and the second electrode of the second capacitor are disposed in a same layer and made of a same material; or
a first electrode and a second electrode of the first transistor, a first electrode and a second electrode of the second transistor, the first electrode of the first capacitor, and the first electrode of the second capacitor are disposed in a same layer and made of a same material; or
a gate of the first transistor, a gate of the second transistor, the second electrode of the first capacitor, and the second electrode of the second capacitor are disposed in a same layer and made of a same material, and a first electrode and a second electrode of the first transistor, a first electrode and a second electrode of the second transistor, the first electrode of the first capacitor, and the first electrode of the second capacitor are disposed in a same layer and made of a same material.

16. The detection substrate according to claim 13, wherein the first storage sub-circuit includes a first capacitor; the second storage sub-circuit group includes a plurality of second storage sub-circuits, each of a part of the plurality of second storage sub-circuits includes a plurality of sub-banks arranged in cascade, each sub-bank includes a third capacitor, and each of a remaining part of the plurality of second storage sub-circuits includes a second capacitor; wherein
a second electrode of the first capacitor, a second electrode of the second capacitor, and a second electrode of the third capacitor are disposed in a same layer and made of a same material; or
a first electrode of the first capacitor, a first electrode of the second capacitor, and a first electrode the second terminal of the third capacitor are disposed in a same layer and made of a same material; or
a second electrode of the first capacitor, a second electrode of the second capacitor, and a second electrode of the third capacitor are disposed in a same layer and made of a same material, and a first electrode of the first capacitor, a first electrode of the second capacitor, and a first electrode of the third capacitor are disposed in a same layer and made of a same material.

17. The detection substrate according to claim 16, wherein the first storage sub-circuit further includes a first transistor, each sub-bank further includes a third transistor, and each of the remaining part of the plurality of second storage sub-circuits further includes a second transistor; wherein
a gate of the first transistor, a gate of the second transistor, a gate of the third transistor, the second electrode of the first capacitor, the second electrode of the second capacitor, and the second electrode of the third capacitor are disposed in a same layer and made of a same material; or
a first electrode and a second electrode of the first transistor, a first electrode and a second electrode of the second transistor, a first electrode and a second electrode of the third transistor, the first electrode of the first capacitor, the first electrode of the second capacitor and the first electrode of the third capacitor are disposed in a same layer and made of a same material; or
a gate of the first transistor, a gate of the second transistor, a gate of the third transistor, the second electrode of the first capacitor, the second electrode of the second capacitor, and the second electrode of the third capacitor are disposed in a same layer and made of a same material, and a first electrode and a second electrode of the first transistor, a first electrode and a second electrode of the second transistor, a first electrode and a second electrode of the third transistor, the first electrode of the first capacitor, the first electrode of the second capacitor and the first electrode of the third capacitor are disposed in a same layer and made of a same material.

18. A detection device, comprising the detection substrate according to claim 13.

19. The detection device according to claim 18, further comprising a processor, wherein the processor is configured to:
input at least one second turn-on signal to the second control signal terminal group in a case where an amount of charge of the electrical signals generated by the photosensitive device is greater than a maximum amount of charge that the first storage sub-circuit is capable to store, so as to turn on the second storage sub-circuit group to store a part of the electrical signals; and
input at least one second turn-off signal to the second control signal terminal group in a case where the amount of the charge of the electrical signals generated by the photosensitive device is less than or equal to the maximum amount of the charge that the first storage sub-circuit is capable to store, so as to turn off the second storage sub-circuit group.

20. A method for driving the detection circuit according to claim 1, comprising:
inputting a first turn-off signal to the first control signal terminal, and the output control sub-circuit being turned off under control of the received first turn-off signal;
inputting a device voltage to the device voltage terminal, converting, by the photosensitive device, the received optical signals into the electrical signals, and transmitting, by the photosensitive device, the electrical signals to the output node under action of the received device voltage;
in a case where an amount of charge of the electrical signals generated by the photosensitive device is less than or equal to a maximum amount of charge that the first storage sub-circuit is capable to store, storing, by the first storage sub-circuit, all the electrical signals, and inputting at least one second turn-off signal to the second control signal terminal group, and the second storage sub-circuit group being turned off under control of the received at least one second turn-off signal; and, in a case where the amount of the charge of the electrical signals generated by the photosensitive device is greater than the maximum amount of the charge that the first storage sub-circuit is capable to store, storing, by the first storage sub-circuit, a part of the electrical signals, and inputting at least one second turn-on signal to the second control signal terminal group, and storing, by the second storage sub-circuit group, a remaining part of the electrical signals under control of the received at least one second turn-on signal; and inputting a first turn-on signal to the first control signal terminal, and transmitting, by the output control sub-circuit, the electrical signals from the output node to the signal receiving terminal under control of the received first turn-on signal.

\* \* \* \* \*